US007986339B2

(12) United States Patent
Higgins

(10) Patent No.: US 7,986,339 B2
(45) Date of Patent: Jul. 26, 2011

(54) AUTOMATED TRAFFIC VIOLATION MONITORING AND REPORTING SYSTEM WITH COMBINED VIDEO AND STILL-IMAGE DATA

(75) Inventor: Bruce E. Higgins, Scottsdale, AZ (US)

(73) Assignee: Redflex Traffic Systems Pty Ltd, Victoria (AU)

(*) Notice: Subject to any disclaimer, the term of this patent is extended or adjusted under 35 U.S.C. 154(b) by 0 days.

(21) Appl. No.: 10/463,880

(22) Filed: Jun. 12, 2003

(65) Prior Publication Data

US 2004/0252193 A1 Dec. 16, 2004

(51) Int. Cl.
*H04N 7/18* (2006.01)

(52) U.S. Cl. ........................................................ 348/149

(58) Field of Classification Search .................. 348/135, 348/139, 142–143, 148–149, 151–155, 161, 348/169; 701/117–119

See application file for complete search history.

(56) References Cited

U.S. PATENT DOCUMENTS

| | | | | |
|---|---|---|---|---|
| 3,866,165 | A | 2/1975 | Maronde et al. | 340/937 |
| 4,887,080 | A | 12/1989 | Gross | 340/937 |
| 5,041,828 | A | 8/1991 | Loeven | 340/937 |
| 5,381,155 | A | 1/1995 | Gerber | 342/104 |
| 5,408,330 | A | 4/1995 | Squicciarini et al. | 386/107 |
| 5,432,547 | A | 7/1995 | Toyama | 348/149 |
| 5,444,442 | A | 8/1995 | Sadakata et al. | 340/916 |
| 5,448,484 | A | 9/1995 | Bullock et al. | 701/117 |
| 5,509,082 | A | 4/1996 | Toyama et al. | 382/104 |
| 5,535,314 | A | 7/1996 | Alves et al. | 382/165 |
| 5,590,217 | A | 12/1996 | Toyama | 382/104 |
| 5,617,086 | A | 4/1997 | Klashinsky et al. | 340/907 |
| 5,708,469 | A | 1/1998 | Herzberg | 348/39 |
| 5,734,337 | A | 3/1998 | Kupersmit | 340/937 |

(Continued)

FOREIGN PATENT DOCUMENTS

CA 2240916 11/1999

(Continued)

OTHER PUBLICATIONS

American Traffic Systems Brochure/Product Description.

(Continued)

*Primary Examiner* — David Czekaj
(74) *Attorney, Agent, or Firm* — Dergosits & Noah LLP

(57) ABSTRACT

A system for monitoring and reporting incidences of traffic violations at a traffic location is disclosed. The system comprises one or more digital still cameras and one or more digital video cameras system deployed at a traffic location. The camera system is coupled to a data processing system, which comprises an image processor for compiling vehicle and scene images produced by the digital camera system, a verification process for verifying the validity of the vehicle images, an image processing system for identifying driver information from the vehicle images, and a notification process for transmitting potential violation information to one or more law enforcement agencies. The video camera system is configured to record footage both before and after the offense is detected. The video camera system includes a non-stop video capture buffer that records the preceding few seconds of violation. The buffer holds a number of seconds of video data in memory. When an offense is detected, a timer is started. At the end of the timer period a video clip of the current buffer contents is recorded. The resulting video clip is incorporated with the conventional evidence set comprising the digital still images of the offense with the identifying data of the car and driver.

9 Claims, 21 Drawing Sheets

U.S. PATENT DOCUMENTS

| | | | | | |
|---|---|---|---|---|---|
| 5,774,569 | A | * | 6/1998 | Waldenmaier | 382/100 |
| 5,805,209 | A | * | 9/1998 | Yuge et al. | 348/149 |
| 5,809,161 | A | * | 9/1998 | Auty et al. | 382/104 |
| 5,896,167 | A | * | 4/1999 | Omae et al. | 348/149 |
| 5,935,190 | A | | 8/1999 | Davis et al. | 701/119 |
| 6,100,819 | A | | 8/2000 | White | 340/933 |
| 6,111,523 | A | * | 8/2000 | Mee | 340/937 |
| 6,163,338 | A | * | 12/2000 | Johnson et al. | 348/148 |
| 6,188,329 | B1 | | 2/2001 | Glier et al. | 340/937 |
| 6,204,778 | B1 | * | 3/2001 | Bergan et al. | 340/905 |
| 6,226,329 | B1 | * | 5/2001 | Ishibashi | 375/240.26 |
| 6,281,808 | B1 | | 8/2001 | Glier et al. | 340/933 |
| 6,373,402 | B1 | | 4/2002 | Mee | 340/937 |
| 6,411,328 | B1 | * | 6/2002 | Franke et al. | 348/149 |
| 6,442,474 | B1 | * | 8/2002 | Trajkovic et al. | 701/117 |
| 6,466,260 | B1 | * | 10/2002 | Hatae et al. | 348/149 |
| 6,546,119 | B2 | | 4/2003 | Ciolli et al. | 382/104 |
| 6,573,929 | B1 | | 6/2003 | Glier et al. | 348/149 |
| 6,647,361 | B1 | * | 11/2003 | Laird et al. | 703/8 |
| 6,754,663 | B1 | | 6/2004 | Small et al. | 707/102 |
| 6,970,102 | B2 | * | 11/2005 | Ciolli | 340/933 |
| 2002/0054210 | A1 | * | 5/2002 | Glier et al. | 348/149 |
| 2004/0054513 | A1 | | 3/2004 | Laird et al. | 703/8 |

FOREIGN PATENT DOCUMENTS

| | | |
|---|---|---|
| DE | 44 28 306 A | 4/1996 |
| EP | 0396432 | 11/1990 |
| EP | A2-0 396 432 | 11/1990 |
| EP | 0 621 572 A | 10/1994 |
| EP | 0 651 364 A | 5/1995 |
| FR | A1-2 678 412 | 12/1992 |
| GB | 2 266 398 A | 10/1993 |
| GB | A-2 266 398 | 10/1993 |
| WO | WO 88/09023 | 11/1988 |
| WO | WO 94/28527 A | 12/1994 |
| WO | WO 98/19284 | 5/1998 |

OTHER PUBLICATIONS

Nestor Intelligent Sensors, Inc. Proposal for Traffic Signal Violation Photo-Monitoring System, copyright 1998.

Search Report in the Second Office Action issued Aug. 23, 2005 of the Canadian Intellectual Property Office in Canadian Patent Application No. 2,470,744.

Nelson H C Yung, et al., "An Effective Video Analysis Method for Detecting Red Light Runners" IEEE Transactions on Vehicular Technology, IEEE Service Center, Piscataway NJ US vol. 50, No. 4, Jul. 2001 XP011064295 ISSN: 0018-9545.

European Patent Office Communication, Application No. 04253502.1-2215, dated Mar. 30, 2009, pp. 1-3.

* cited by examiner

150

| DATA PATH | INFORMATION TRANSFER |
|---|---|
| 1A | 4 IMAGES PER INCIDENT AND ASSOCIATED DATA SENT VIA MODEM |
| 1B | X SECONDS OF VIDEO OF THE INCIDENT |
| 2 | PRIMARY EVIDENCE IMAGES SAVED TO FILE SERVER |
| 3 | COMPRESSED SCENE IMAGES AND INCIDENT DETAILS |
| 4 | INCIDENT DETAILS AND COMPRESSED IMAGES |
| 5 | PLATE AND FACE IMAGES |
| 6 | VEHICLE, OWNER, AND DRIVER'S LICENSE DETAILS SENT VIA MODEM |
| 7 | INCIDENT DETAILS AND COMPRESSED IMAGES |
| 8 | INCIDENT DETAILS AND COMPRESSED IMAGES SENT VIA MODEM |
| 9 | NOTICE DETAILS AND RECEIPT ACKNOWLEDGEMENT SENT VIA MODEM |
| 10 | NOTICE AND INCIDENT DETAILS |
| 11 | NOTICE TO APPEAR LETTER SENT VIA MAIL |
| 12 | PAYMENT REMINDER LETTER(S) SENT VIA MAIL |
| 13 | PAYMENT OR COURT APPEARANCE |
| 14 | NOTICE DISPOSITION INFORMATION, e.g. PAID, DISMISSED, SENT TO TRAFFIC SCHOOL, DETAILS SENT VIA MODEM |

FIG.1B

AUTOMATED TRAFFIC VIOLATION MONITORING AND REPORTING SYSTEM WITH COMBINED VIDEO AND STILL-IMAGE DATA

FIELD OF THE INVENTION

The present invention relates generally to traffic monitoring systems, and more specifically to a system for detecting and monitoring the occurrence of traffic offenses and providing video and still photographic evidence of offenses to traffic enforcement agencies.

BACKGROUND OF THE INVENTION

Camera-based traffic monitoring systems have become increasingly deployed by law enforcement agencies and municipalities to enforce traffic laws and modify unsafe driving behavior, such as speeding running red lights or stop signs, and making illegal turns. The most effective programs combine consistent use of traffic cameras supported by automated processing solutions that deliver rapid ticketing of traffic violators, with other program elements including community education and specific targeted road safety initiatives like drunk-driving enforcement programs and license demerit penalties. However, many current traffic enforcement systems using photographic techniques have disadvantages that generally do not facilitate efficient automation and validation of the photographs required for effective use as legal evidence.

Digital-based red-light camera systems have come to replace traditional 35 mm analog-based cameras and photographic techniques to acquire the photographic evidence of traffic offenses. In the field of traffic enforcement technologies, capturing vehicle offense data involves a compromise between storage space requirements and image resolution. Typically, an offense is recorded as a number of still images of the vehicle together with some pertinent information such as speed, time of offense, and so on.

Red-light violation recording has traditionally been done with still cameras, either digital or wet film, or with video camera systems. These systems suffer from a number of shortcomings. For example, still images typically do not convey enough information to assess the circumstances surrounding a violation. A vehicle forced to enter an intersection after the traffic signals are red while yielding to an emergency vehicle will be shown as a violator on still images and the vehicle's driver will be prosecuted if the emergency vehicle does not appear in the still images. Also, at many intersections vehicles are permitted to turn during a red light if they first stop. Still images do not show the acceleration and speed of a vehicle and cannot determine if the vehicle has progressed unlawfully, i.e., without first stopping. For speed enforcement, vehicle speed must be determined from the vehicle detection device and imprinted on the photograph. Errors in the vehicle's detected speed will not be apparent on the photograph, as still images do not convey any impression of speed. Although multiple still photographs may be taken to show speed across two or more points, this solution results in increased image capture and storage requirements and causes the camera to be occupied for the duration of the image sequence.

Image resolution is critical to providing sufficient information to resolve important scene details such as the identifying data comprising the vehicle license (registration) plate and the driver's face. However, increasing image resolution also increases data storage requirements.

To solve the problem of providing contextual or background evidence surrounding a potential traffic offense at a photo-monitored location, video has been incorporated in some red-light traffic systems. However, the advent of video has certain significant disadvantages. Most notably, when an enforcement agency wishes to use video in their evidence set, the problems related to transmission bandwidth and data storage is significantly compounded. Digital video technology generates data at a vastly greater rate than digital still-image technology, given the same resolution. Although video footage has been used for identification and prosecution of vehicles in violation of traffic laws, the generally low resolution of present video systems makes it difficult to determine the fine details required for prosecution, such as the vehicle license plate or the features of the driver's face. The low resolution problem also requires the video camera to be close to the detected vehicle or to physically move and track the vehicle, both of which are major disadvantages when used in automated traffic monitoring systems. Although high-resolution video cameras can be employed for identification and prosecution of vehicles in violation of traffic laws, if the information from a high-resolution video camera is stored digitally, the amount of file storage required makes it difficult or impractical to store and communicate the amount of information generated. This is especially true for systems that do not provide efficient video clips, but rather shoot and transmit long loops of constant video data.

The standard start/stop capturing mechanism available in almost all video capture systems is inadequate to satisfy the requirement for providing footage both before and after the offense is detected. By the time the offense is detected it is too late to start a video capture sequence. It is also generally difficult to anticipate an offense and preemptively commence video capture. Furthermore, where the footage from a video system is recorded on magnetic tape the retrieval of information is time consuming and finding a specific violation or incident cannot be done instantaneously.

SUMMARY AND OBJECTS OF THE INVENTION

It is an object of embodiments of the present invention to combine high-resolution still digital images and low-resolution video into a single set of information to be used to record the instances of traffic violations in a manner that minimizes data transfer and storage requirements.

It is a further object of embodiments of the present invention to incorporate a "before" and "after" video sequence that enables reviewers to identify mitigating or aggravating circumstances immediately following or preceding a traffic offense detection.

It is yet a further object of embodiments of the present invention to provide a means of visually verifying the speed of the detected vehicle without using multiple high-resolution still images.

It is also an object of embodiments of the present invention to provide a means for easy retrieval of specific incidents or driver/car information from stored or archived data.

A system for capturing both high-resolution detail and video footage of a traffic offense in single evidence set from a single offense-capturing device is disclosed. The system comprises a networked digital camera system strategically deployed at a traffic location. The camera system is remotely coupled to a data processing system. The data processing system comprises an image processor for compiling vehicle and scene images produced by the digital camera system, a verification process for verifying the validity of the vehicle images, an image processing system for identifying driver information from the vehicle images, and a notification process for transmitting potential violation information to one or more law enforcement agencies.

The networked digital camera system houses a conventional still-image digital camera system and a video camera system. The video camera system is configured to record footage both before and after the offense is detected. This provides the law enforcement agency with a more complete record of the events leading up to and following on from the offense itself. This may assist agency staff to better perceive the context of the offense or even detect further offenses by the same vehicle. For instance, a still-imaging system will detect a car both before and after the line at a red light, but with video the offense processing staff may also note that the car entered the intersection to yield to emergency vehicles, or that the car also lost control and became involved in an accident.

The video camera system includes a non-stop video capture buffer that records activity at the location, including the moments preceding the offense. A buffer holds a number of seconds of video data in memory. When an offense is detected, the system starts a timer. At the end of the timer period, a portion of the video (video clip) of the current buffer contents is extracted and stored. The resulting video clip is then incorporated with the conventional evidence set comprising the digital still images of the offense with the identifying data of the car and driver.

The combination of still and video footage solves the problems associated with the demand for video and the need for high resolution and low storage and transmission costs. Because the still-images continue to provide the high resolution necessary to extract important details from the evidence set, the video record can be captured using low resolution technologies that do not unduly tax the storage and data transmission systems.

Other features and advantages of the present invention will be apparent from the accompanying drawings and from detailed description that follows.

BRIEF DESCRIPTION OF THE DRAWINGS

The present invention is illustrated by way of example and not limitation in the figures of the accompanying drawings, in which like references indicate similar elements, and in which:

FIG. 1B is a table that outlines some of the information transferred along the data paths illustrated in FIG. 1A for an exemplary traffic violation monitoring and reporting incidence;

DESCRIPTION OF THE PREFERRED EMBODIMENTS

An automated system for monitoring and reporting incidences of traffic violations utilizing both still and video camera systems is described. In the following description, for purposes of explanation, numerous specific details are set forth in order to provide an understanding of the present invention. It will be evident, however, to those of ordinary skill in the art that the present invention may be practiced without the specific details. In other instances, well-known structures and devices are shown in block diagram form to facilitate explanation. The description of preferred embodiments is not intended to limit the scope of the claims appended hereto.

Figure 1A:
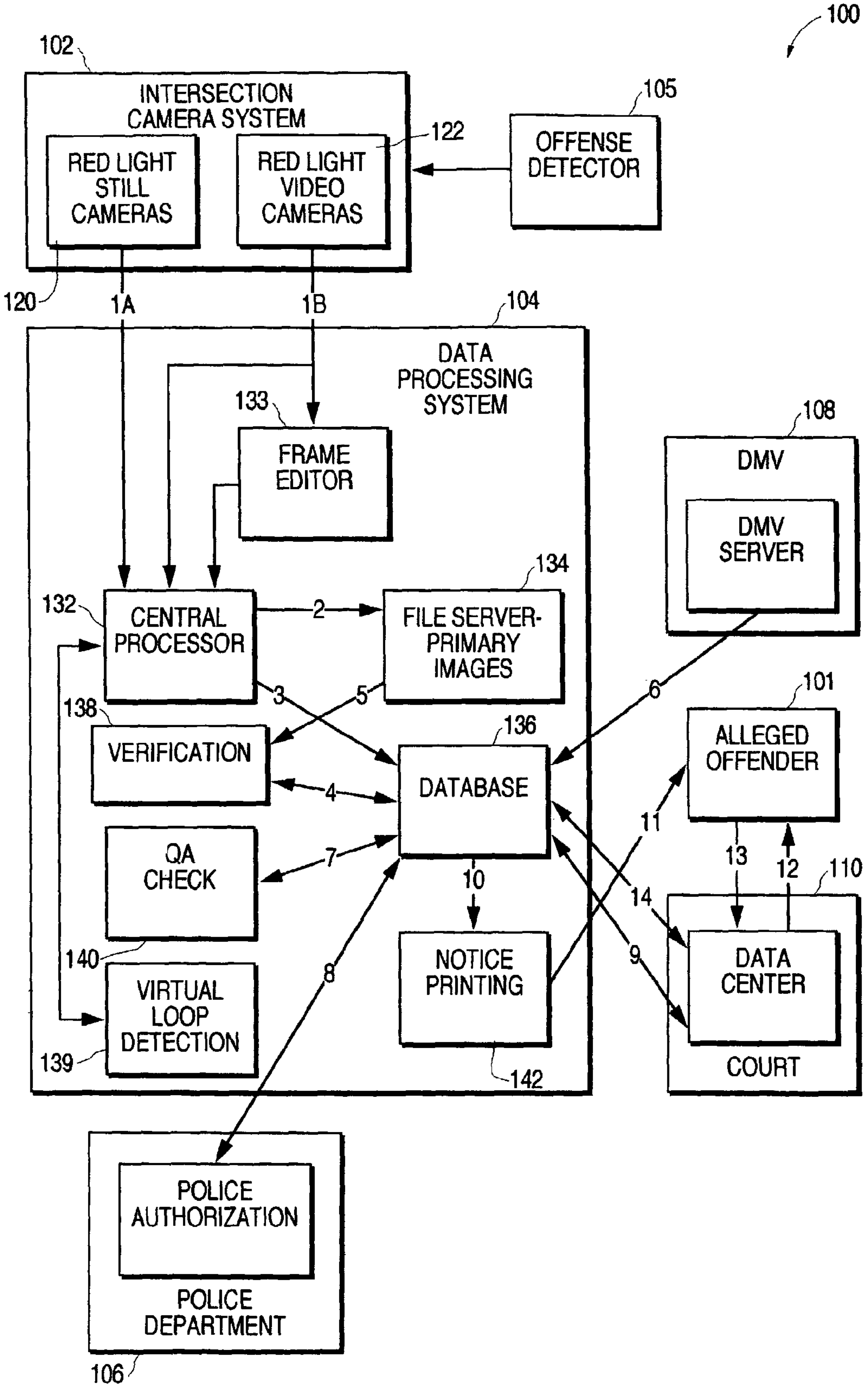
FIG. 1A is a block diagram that illustrates the overall traffic violation processing system, according to one embodiment of the present invention.

FIG. 1A is a block diagram that illustrates the overall traffic violation processing system, according to one embodiment of the present invention. The main components of the traffic violation processing system 100 comprise the intersection camera system 102, an offense detector system 105, the data processing system 104, the police department interface system 106, the motor vehicle department interface 108, the court interface 110.

The red light camera system 102 consists of one or more still cameras 120 and one or more video cameras 122 arranged at or around the intersection or traffic location being monitored. When an alleged offender 101 commits an offense at an intersection as detected by the offense detector 105, the red light cameras in the intersection camera system 102 sense and record the event. In one embodiment of the present invention, both digital still photographs as well as a portion of video, such as five to ten seconds of video capturing the event are recorded and sent to the data processing system 104. The data processing system 104 then performs various data processing steps to verify and validate the driver and offense data. The data processing system 104 itself includes various components, such as central processor 132, file server 134, database 136, verification module 138, quality assurance module 140, and notice printing module 142. The data processing system 104 receives data from various external sources, such as the intersection cameras and motor vehicle agencies, and processes the data for further action by the appropriate law enforcement agencies.

As illustrated in FIG. 1A, various items of information regarding the driver and the vehicle are obtained by the data processing system 104 from selected authorities, such as a motor vehicle department through the motor vehicle department interface 108, and a police department through the police department interface 106. Typically this information is extracted from the still picture data obtained by the still cameras 120. The video data captured by video cameras 122 is provided to supply contextual information relating to the event. For this embodiment, the resolution of the video camera can be lower than that of the still cameras since general scene data is being provided. This reduces data storage and transmission requirements compared to systems in which long clips of high resolution video is captured.

In an alternative embodiment of the present invention, identifying information can be extracted from the video data captured by the video cameras 122. For this embodiment still photo images are extracted from the video clip, thus the resolution of the video camera system should be high enough to provide detailed information. An optional frame editor 133 in the data processing system can be used to isolate and label the appropriate frames to be processed as still video images. The detection system for system 100 can comprise either or both of the physical offense detector 105 or virtual loop detector 106 to trigger the capture of still and video clip data of the offense.

When the information relating to the offense is deemed to be valid, it is provided through the court interface system 110 to the appropriate court authorities.

As illustrated in FIG. 1A, the offense detector 105 may be embodied in a physical detection system that is placed at the intersection, such as a magnetic, optical, or electrical system that detects the presence or movement of a vehicle through the intersection. If the vehicle is detected at the wrong time or at the wrong speed, the detector 105 triggers the still and video cameras in system 102 to photograph the incident. In an alternative embodiment, the detection system for the video cameras can be implemented through a virtual loop detector process 139. For this embodiment, a virtual loop or trigger is defined within the field of view captured by the video cameras 122. When the vehicle is photographed or video-taped in this virtual location at an improper time, a timer for capturing a video clip from the video footage is triggered.

For the system shown in FIG. 1A, various data paths, numbered 1 to 14, are provided among the components and sub-components of system 100. FIG. 1B is a table that outlines some of the information transferred along these data paths in a typical traffic violation monitoring and reporting incidence. Together, Table 150 in FIG. 1B, and the data paths shown in FIG. 1A constitute a data flow process for the traffic violation processing system 100. As shown in FIGS. 1A and 1B, the data provided by the intersection camera system 102 consists of still photos 1A and video data 1B. There can be any number of still photos for the incident, typically four to six separate digital photos, and any length video clip of the incident, typically four to ten seconds of video surrounding the incident. Because the still photos and video clip are provided by separate camera systems 120 and 122, they can provide photographic data at different resolutions. To minimize the transmission bandwidth and data storage requirements, the still photos can be generated and processed at high resolution to provide highly accurate identification and evidentiary images, while the video data can be of lower resolution, since it is primarily intended to provide background information.

If the red light cameras in the intersection camera system 102 detect a violation incident, a number of images (typically, four) of the incident, along with associated data (such as time and vehicle speed) are captured and transmitted to the central processor 132 of the data processing system 104. These images and the associated data comprise the primary evidence of the violation and are saved in the primary images file server 134. The central processor produces compressed scene images and incident details, and transmits these to database 136 for storage. In one embodiment, a violation is detected though the use of known wireless transmission methods, such as radar or similar waves, or through light beam detection methods, or similar techniques to determine whether a vehicle is traveling too fast or has run a red light or stop sign. Alternatively, the violation is detected through the use of physical ground loops placed within the road surface. The presence of a car in the proximity of a loop at an improper time in relation to traffic lights or other controls will signal the occurrence of a potential traffic violation.

The images captured by the intersection camera system still cameras 120 typically include at least one image of the vehicle committing the violation (i.e., running the red light), as well as images of the vehicle license plate and driver's face to provide car and driver identification information. The license plate and driver's face images are transmitted from the primary image file server to the verification module 138. Based on the vehicle license plate information, the details of the vehicle and its owner are then accessed at an appropriate motor vehicles department 108, and transmitted to the database 136. Along with the still picture images, a video clip of the violation is also captured by video cameras 122. The video data is then associated with the corresponding still image data for viewing by the authorities. This allows the amount of data that is required to be generated and transferred to be reduced from about 80 Mbytes of data (for current systems that transmit only high resolution video data) to about 2.5 Mbytes of data for a combination of low-resolution video and high-resolution still images.

The incident details and compressed images stored in the database 136 are next sent to the quality assurance module 140. Once the quality assurance module has checked the incident data for accuracy and integrity, the details and compressed images are sent to an appropriate police agency 106. If the police authorize a notice to be sent to the identified driver, notice details are sent to the appropriate court 110 by the data processing system 104. The notice and incident details are also transmitted from the database 136 to the notice printing module 142 of the data processing system 104. The prepared notice is then sent to the alleged offender 101 by the data processing system 104. Follow-up correspondence, such as payment reminder letters, may be sent to the alleged offender from the court 110. The alleged offender may then submit payment or make a court appearance to satisfy the notice. A notice of the disposition of the violation is then sent from the court 110 to the data processing system 104 and stored in the database 136. This completes the data processing loop for a typical violation, according to one embodiment of the present invention.

The structure and operation of the sub-components of each of the main components of traffic violation processing system 100 will be described in greater details in the description that follows.

Intersection Camera System

A typical enforcement application of the digital camera component 102 of system 100 is in the area of red-light offense detection. For this application, the still camera or cameras 120 of camera system 102 are strategically placed at an intersection to monitor and record incidences of drivers disobeying a red light. When a vehicle is detected approaching the stop line of a monitored lane, it is tracked and its speed is calculated. If the vehicle is detected entering the intersection against the traffic signal, an evidentiary image set is captured. The event of the images being captured and the relevant details recorded is referred to as an ‘incident’, which may be defined as a potential offense. In one embodiment of the present invention, the evidentiary set consists of four incident images comprised of the following: a scene shot A, which is a scene shot of the intersection prior to the incident vehicle crossing the stop line; scene shot B, which is a scene shot of the intersection when the incident vehicle is seen to have failed to obey the traffic signal; frontal face zoom shot that attempts to identify the driver of the incident vehicle; and a license plate zoom shot that attempts to isolate the vehicle’s license plate area only to identify the vehicle. In one embodiment, the still images captured by the digital camera system 120 are in TIFF or JPEG format, although other digital formats are also possible.

In relation to a potential violation, there are a number of details recorded for each image. These include, the date and time of the incident, the location of the incident, the lapsed time since the traffic signal turned red, and the camera identification. A short video clip of the incident is also recorded and associated with the still image data.

Figure 11:
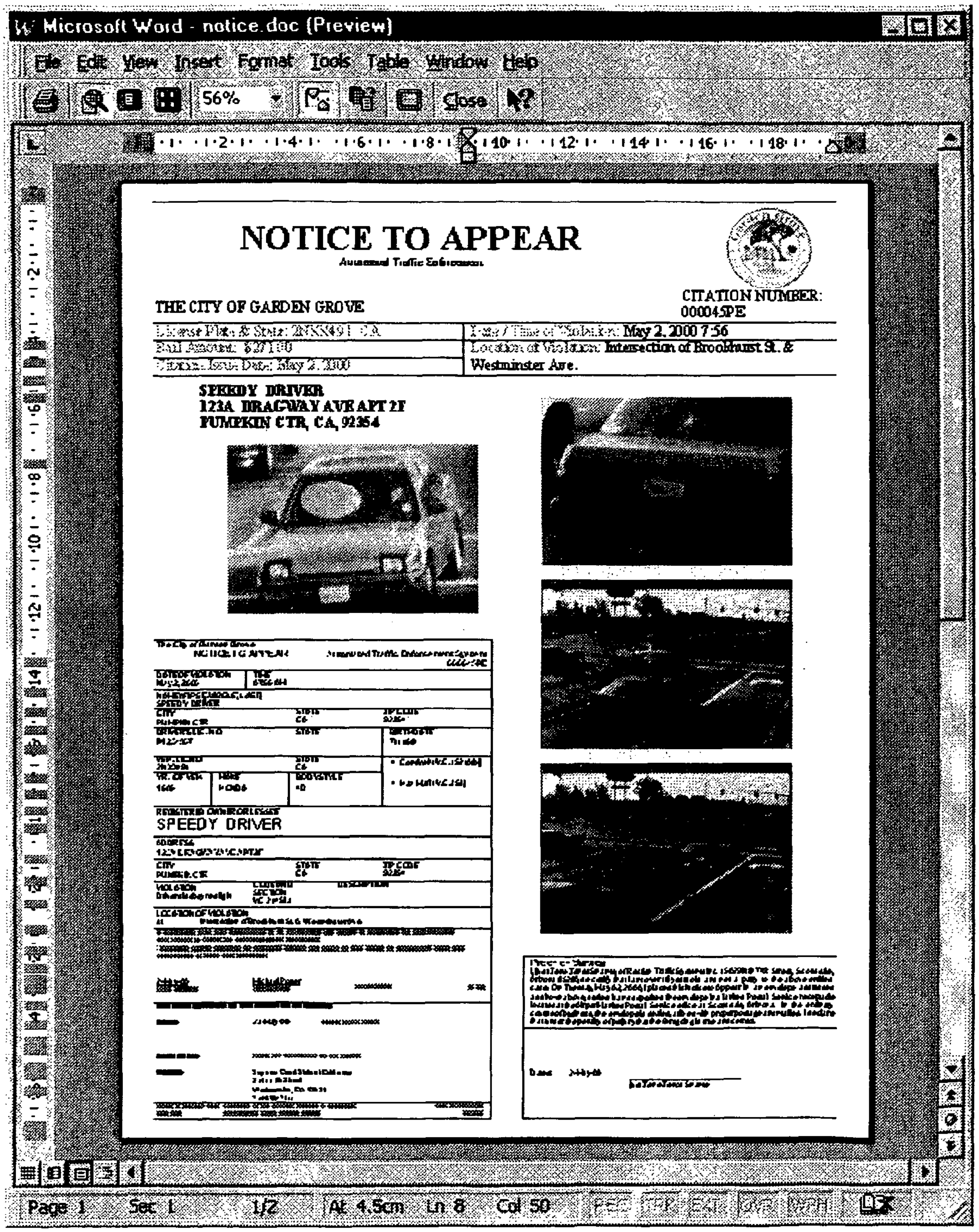
FIG. 11 illustrates a notice preview displayed in a user interface screen, according to one embodiment of the present invention.

The captured data is assigned a ‘digital signature’, encrypted, and then transmitted from the digital camera system 102 to the central processor 132 in the data processing system 104. All four shots when transmitted have their incident details “stamped” on them. In one embodiment, this “stamped information” is embodied in a data bar that appears at the top of images seen at verification process 138 of the data processing system 104. Each of the four shots is individually identifiable as being of a particular type, i.e., scene A, scene B, face shot, and plate shot. FIG. 11 represents a Notice to Appear that includes the photographic images and accompanying reporting information that is provided by the camera system and data processing system of FIG. 1A, according to one embodiment of the present invention. As can be seen in FIG. 11, the four photographs include the driver’s face shot, the license plate shot, and the scene A and scene B shots. The composition and production of the Notice to Appear illustrated in FIG. 11 will be described in greater detail below.

The intersection cameras may be controlled remotely to facilitate system analysis checks and to take test shots. For test diagnostics, a log of captured test shots are recorded. Test shots can be treated as normal and exported to the data processing system for insertion into the database as with ‘ordinary’ shots. Should it become necessary to prove to a court that a camera system was operating correctly at the time a particular incident was detected, the test shots form part of the chain of evidence, which is used to provide evidence of the cameras functioning correctly.

The intersection camera systems are interconnected at the detection site to provide the required camera and flash coordination. Each camera is strategically located to provide the optimum field of view for the desired captured image. The enforcement camera that is equipped/interfaced with the vehicle tracking technology is positioned to effectively record both scene images as well as the license plate area shot. A supplement camera can be positioned to image the offending vehicle driver. The camera and processing systems are interconnected using standard local area network typologies. The camera system 102 can also be configured to send secure (encrypted) incident data and image information to the data processing system 104 over a computer network line, such as modem and telephone line.

Figure 1C:
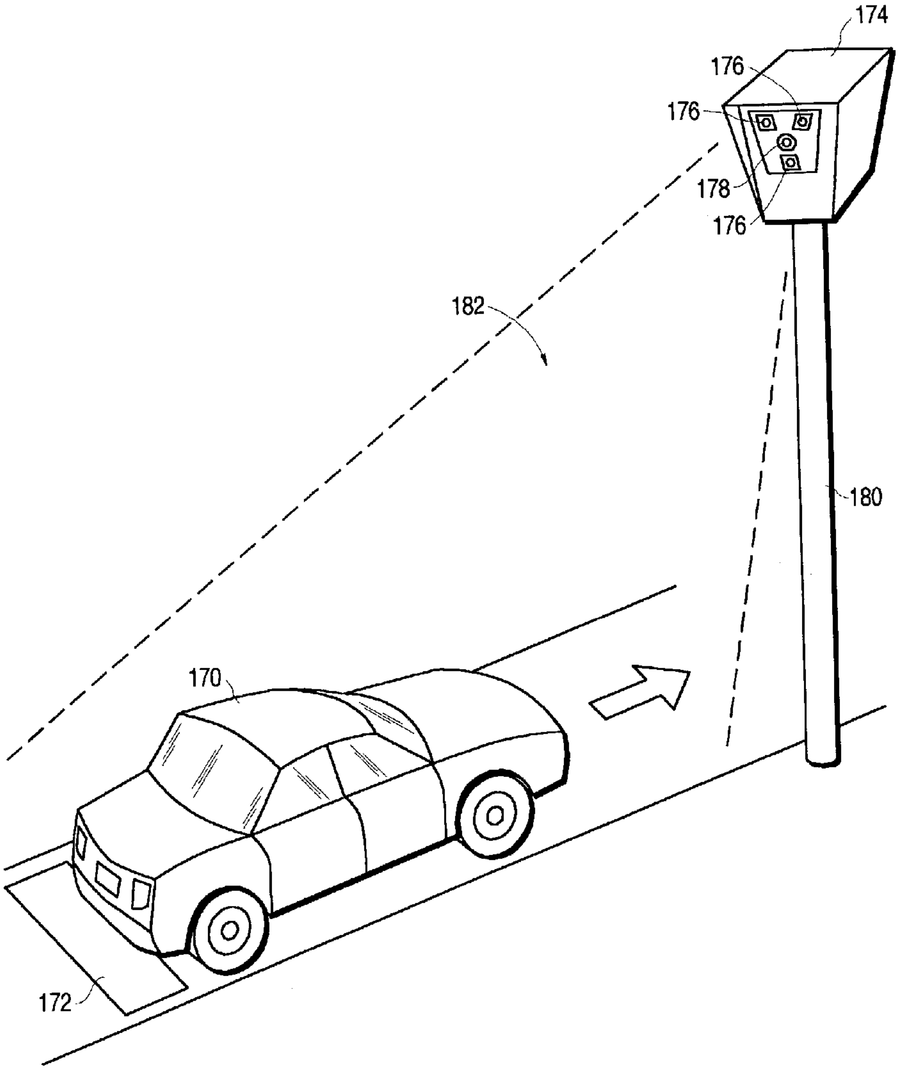
FIG. 1C illustrates the deployment of a traffic violation camera system at a traffic location, according to one embodiment of the present invention.

FIG. 1C illustrates the deployment of an intersection camera system at an intersection, according to one embodiment of the present invention. The cameras and processing circuitry are housed in a body 174 that is placed on a pole or other support structure 180 above the monitored location, typically adjacent to a traffic light or stop sign. The height and position of the camera system is selected to allow a sufficient field of view 182 of the monitored location. A loop detector 172 placed in the roadway detects the improper presence or movement of a vehicle 170 at the monitored location. This is used to trigger the cameras to capture photographic evidence of the offense. In one embodiment, the housing holds three separate digital still cameras 176 and a single video camera 178. Depending upon implementation constraints and system capabilities, different camera configurations may be used, such as one or several still and/or video cameras housed at single or distributed locations around the location. If a sufficiently high-resolution video camera is utilized, a single video camera may be used from which both video and still images can be extracted.

Portions of the data processing system 104 illustrated in FIG. 1A may be housed within the body 174. For example a computer that includes central processor 132 may be closely coupled to the cameras 176 and 178 within housing 174. Alternatively, housing 174 may be configured to hold only the cameras 176 and 178. In this case, hardwire, wireless, or telephonic network connections can be used to couple the cameras to the central processor and other components of the data processing system 104. This system can be provided in a separate housing at the location or at a remote location some distance from the monitored location.

Still Camera System

In a preferred embodiment of the present invention, the traffic violation processing system 100 utilizes digital camera technology for the still cameras 120. Such a digital camera system targets specific areas of interest with a system consisting of several imaging elements. The advantage of such a configuration is the targeting of resolution where it is needed, while preserving the rationale that the extracted images are captured at the same moment in time.

Charge-Coupled Device (CCD) imaging elements can be used for the digital still cameras. These typically provide spatial and dynamic resolution that is equal to or better than 35 mm celluloid-based film. In the intersection camera system 102, a scaleable multi-element digital camera system designed specifically for traffic enforcement applications is used. This camera system is specifically designed to address the issues of image resolution, dynamic range, and imaging rates (i.e., frame per second) towards the special requirements of offense prosecutability where the images form the primary evidence.

A CCD is an image acquisition device capable of converting light energy emitted or reflected from an object into an electrical charge that is directly proportional to the entering light's intensity. This charge or pixel can then be sampled and converted into the digital domain. The digital pixel information is cached and transferred to RAM (Random Access Memory) in a host computer system in bursts via a local bus where further processing and final storage occurs.

The fundamental imaging requirement for prosecutability of an image is clear identification of the offense committed and identification of the offending vehicle. In a multiple camera system, each imaging element must be synchronized and triggered concurrently to ensure all captured images correlate the same event that is the exact time base.

Figure 3A:
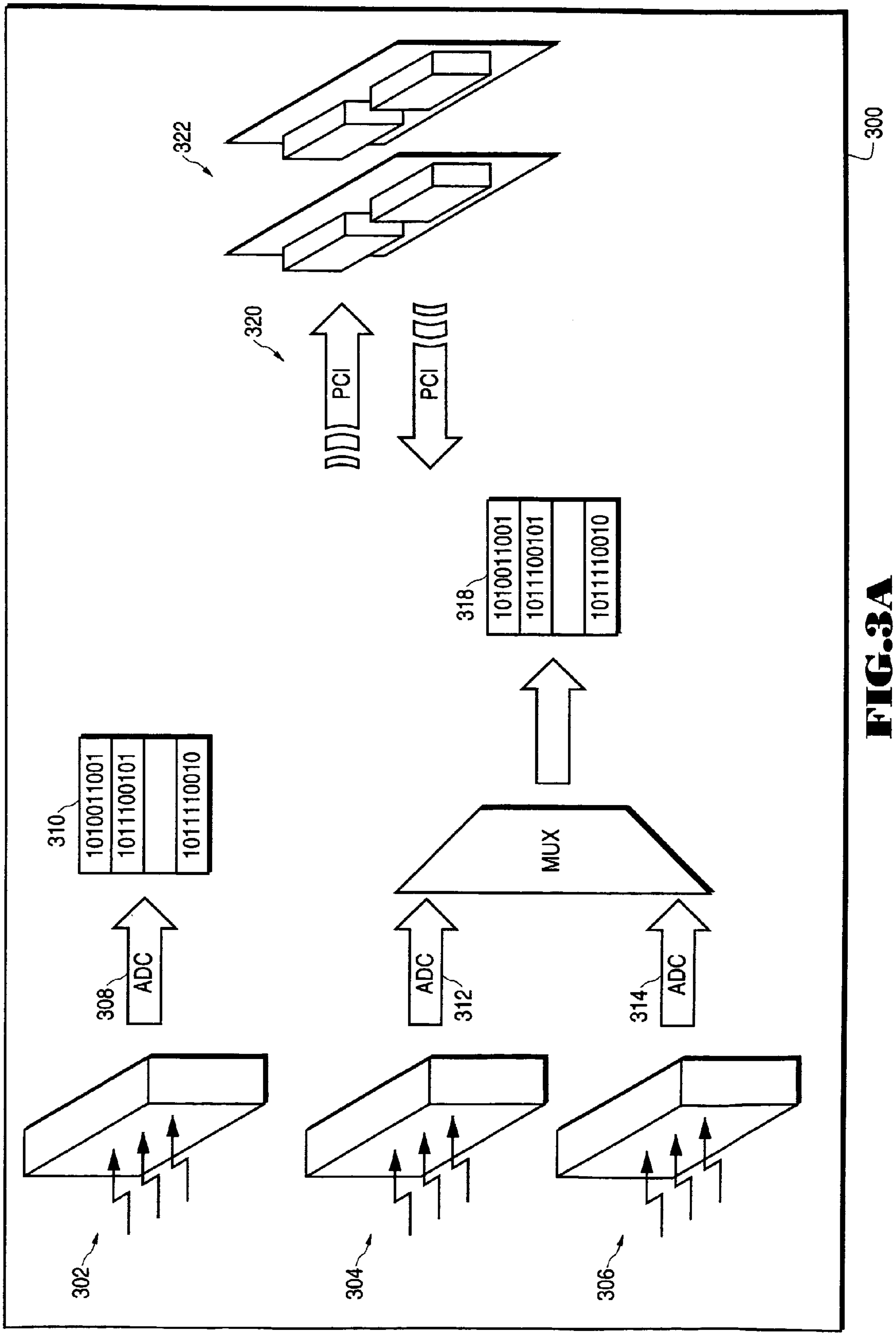
FIG. 3A is a block diagram illustration of a multiple element CCD intersection camera system, according to one embodiment of the present invention.

FIG. 3A illustrates a multiple element CCD intersection camera system for use in still cameras 120, according to one embodiment of the present invention. Camera system 300 in FIG. 3A illustrates a representative camera system comprising a primary CCD 302 and two secondary CCDs 304 and 306. The CCDs 302, 304, and 306 convert the incoming light into electronic charge. The charge is then moved through an analog shift register to provide a serial stream of charge data, similar to a bucket brigade. For camera system 300, image data from primary CCD 302 is processed through an ADC (Analog to Digital Converter) process 308 to produce digital data streams 310. The image data from the two secondary CCD cameras 304 and 306 are each processed through respective ADC processes 312 and 314 and input to a multiplexer 316 to produce digital data streams 318.

The basic operation of the CCD in camera system 300 is next described. For each camera, the CCD image sensing area is configured into horizontal lines containing several pixels. As light enters the silicon in the image sensing area, free electrons are generated and collected inside photosensitive potential wells. The quality of the charge collected in each pixel is a linear function of the incident light and the exposure time. After exposure, the charge packets are transferred from the image area to the serial register at the rate of one line per clock pulse. Once an image line has been transferred into the serial register, the serial register gate can be clocked until all of the charge packets are moved out of the serial register through a buffer and amplification stage producing an analog signal. This signal is sampled with high-speed ADC devices to produce a digital image.

Color sensing is achieved by laminating a striped color filter with RGB (Red, Green, Blue) organization on top of the image sensing area. The stripes are precisely aligned to the sensing elements, and the signal charged columns can be multiplexed during the readout into three separate registers with three separate outputs corresponding to each individual color. Each red, green, and blue pixel from the CCD is processed by a high-resolution analogue to digital converter capable of high sampling rates. Once in the digital domain, the pixel charge is held in cache as it waits for a data transfer window to be made available by the host computer system for transfer into host RAM.

In one embodiment of the present invention, the image data is transferred from the CCDs 302, 304, and 306 to the host system RAM 322 using a PCI (Peripheral Component Interconnect) interface 320. For many present computer systems, PCI has become the local bus standard for interconnecting chips, expansion boards, and processors. The original PCI architecture implements a 32-bit multiplexed address and data bus.

In accordance with standard PCI usage, in camera system 300, communication between devices on the PCI bus occurs through a mechanism of burst transfers. A burst transfer consists of the establishment of a bus master (an I/O cycle—in order for the initiator of the burst to attain master status on the bus) and the bus slave (target) relationship. The length of the burst is negotiated at the beginning of the transfer, and may be of any length. At burst completion, the receiving end (target) terminates the communication after the pre-determined amount of information has been received. Only one bus master device can communicate on the bus at a time. Other devices cannot interrupt the burst process because they do not have master status.

The integration of the CCD imaging device directly into the final processing computer system short cuts the traditional process of capturing digital images through video based cameras, converting the composite analog signal into a digital image with the use of 'Frame Grabber' and then importing the resultant image into the host computer for processing. The losses in image quality that occur due to the digital-analog-digital conversion in these systems, limit their application for traffic enforcement purposes. Furthermore, video based cameras are typically limited in resolution and dynamic range.

Dynamic resolution is an important characteristic of the camera system 300. Dynamic resolution defines the size of each pixel data once converted into digital form. The relationship is proportional to the CCD camera's ability to represent very small and large light intensity levels concurrently (i.e., the Signal to Noise Ratio, SNR) and is represented in Decibels (dB). Accordingly the sampling ADC is matched to exhibit an equivalent SNR.

The application of dynamic resolution in enforcement programs provides for a mechanism of identifying vehicle license plates with retro-reflective composites. When flash photography is used in the reproduction of high quality images, the light energy that is directed towards the license plate area is reflected back at a level (result of a high reflection efficiency), that is higher then the average intensity entering the camera. Consequently an optical burn effect (i.e. over exposure) appears around the area of the license plate.

The effect of optical burn, or "plate burn" is minimized with the utilization of a CCD and ADC system with a dynamic range capable of resolving the resultant intensity spectrum. A histogram of the image will reveal all scene and license plate details residing at opposing ends of the spectrum.

The license plate having the strongest intensity will appear at the highest levels and the rest of the image proportioned across the rest of the spectrum. However, most computing systems, and indeed the human eye, can only resolve 256 levels (or 48 dB=8 bits) of intensity. Typical 35 mm Celluloid film of 100 ASA is considered to have 72 dB of equivalent dynamic resolution. This dynamic range can resolve 4096 level of intensity and is represented by a 12-bit word.

To limit the volume of data and information kept for evidentiary purposes, a process of "Histogram Slicing" can be used to scale down the overall pixel data size from 12 bits down to 8 bits by selecting only 256 of the available 4096 levels. The selection criteria will ensure that the visual integrity of the image is ensured but will also normalize the overall appearance such that overexposed areas are in balance with the rest of the image. Ideally the process would be a non-linear function that is adaptive in nature to compensate for ambient and exposure conditions. The translation for speed and efficiency would be a mapping (or lookup) function.

Figure 4A:
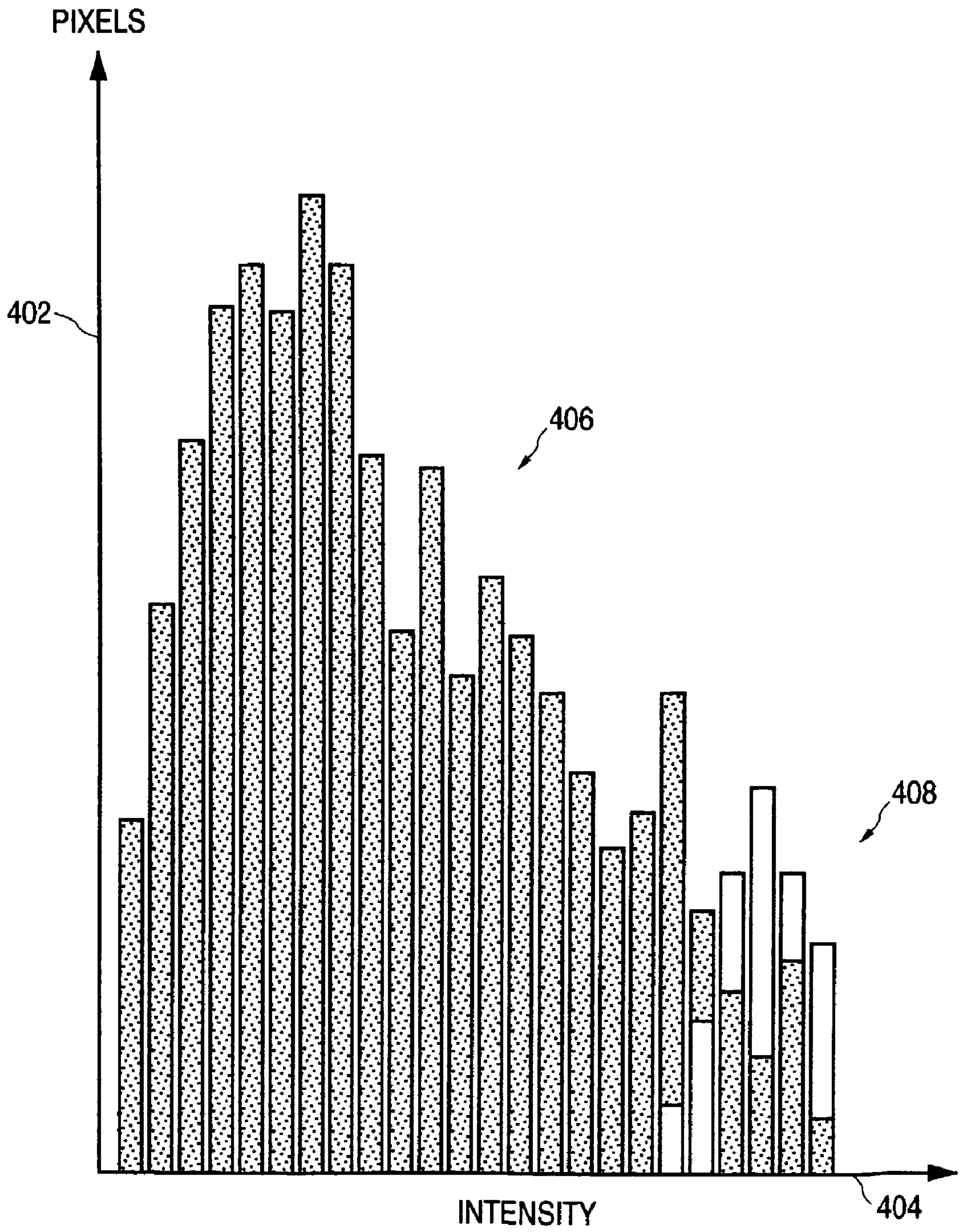
FIG. 4A illustrates a histogram of a pixel intensity for an intersection image, according to one embodiment of the present invention.
Figure 4B:
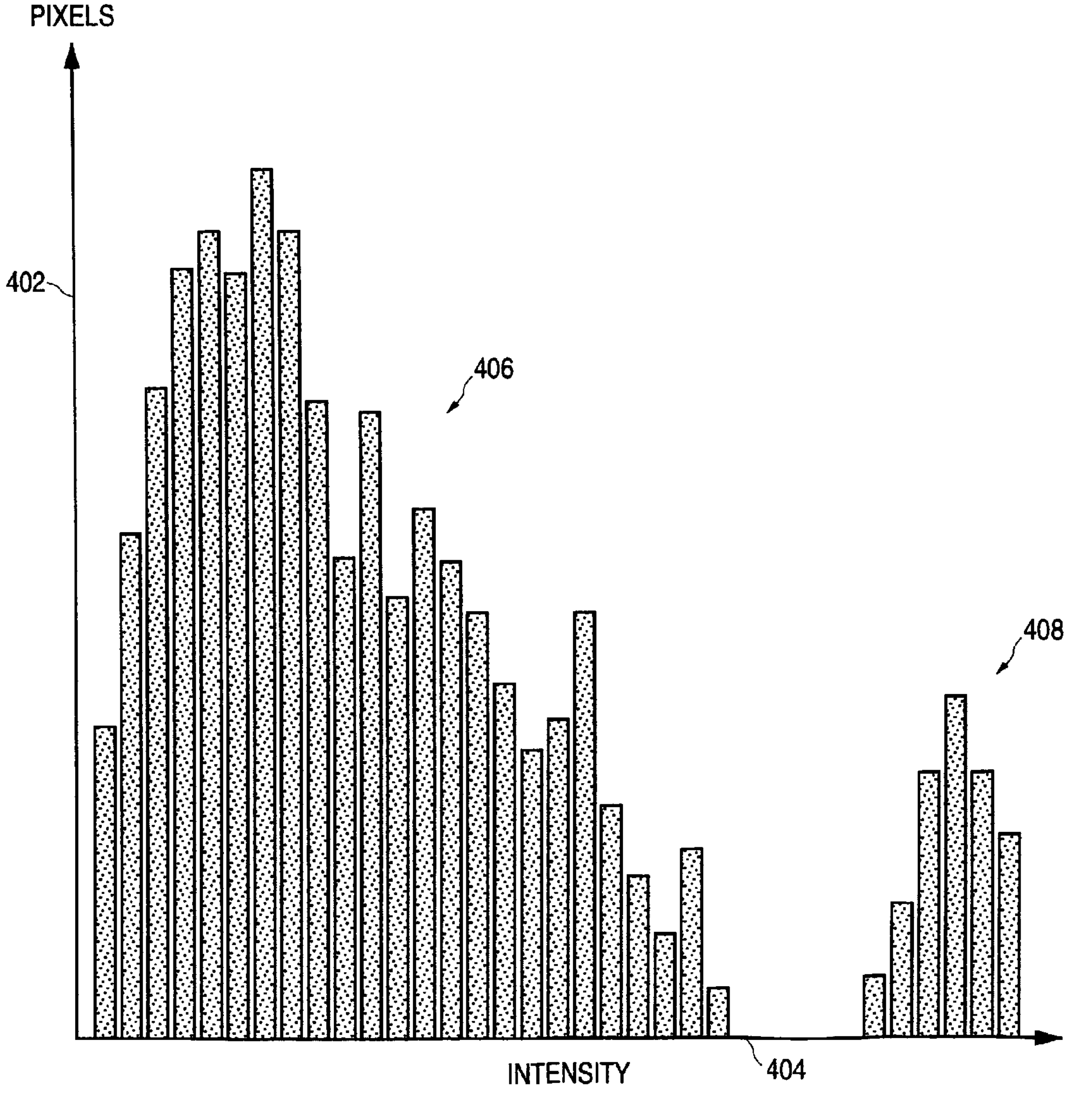
FIG. 4B illustrates the histogram of FIG. 4A with the license plate image isolated from the background scenery image.

FIG. 4A illustrates a histogram of pixel intensities for an intersection image, according to one embodiment of the present invention, and FIG. 4B illustrates the histogram of FIG. 4A with the license plate image isolated from the rest of the images that make up the vehicle and background scene. Details of the digital imaging process that isolates the license plate image are described in U.S. Pat. No. 6,240,217, entitled "Digital Image Processing", which is assigned to the assignee of the present invention, and which is hereby incorporated by reference. The histograms of FIGS. 4A and 4B illustrate the intensities of individual pixels in a traffic violation image on a pixel 402 axis versus intensity 404 axis. As illustrated in FIG. 4A individual pixel components for the license plate are shown as elements 408 against the pixel components for the background scene 406. Using compression and isolation imaging techniques, the intensity of the pixels for the license plate 408 are altered relative to the intensity for the pixels for the background 406, as illustrated in FIG. 4B. In this manner, the license plate is made more readable relative to the background scenery. It should be noted that the same technique could be applied to other images and components of images, such as to enhance the driver's face relative to the car.

As stated above, a typical enforcement application of the digital camera system illustrated in FIG. 3A is in the area of red-light offense detection. The camera system is strategically placed at an intersection to monitor and record incidences of drivers disobeying a red light. In one embodiment, the primary evidence produced is a set of two images. The first image showing a view of the intersection that encompasses the traffic light of the monitored approach, the offending vehicle prior to crossing the violation line (typically a white line such as a cross-walk) and sufficient background scene depicting the driving conditions at the time of the offense. The second image is typically of the same field of view but with the offending vehicle completely crossed over the violation line in conjunction with the red light.

The main area of interest is the vehicle position before and after the intersection. Although the overall resolution for this image is not critical, sufficient detail must exist to resolve features of the intersection as well as traffic signal active phase. However, in order to identify the offending vehicle the license plate details and jurisdictional information must be legible. For 35 mm wet film cameras the effective spatial resolution must be on the order of 3072×2048 pixels. Even then the license plate details only represent 5 percent of the total number of pixels.

The architecture of the digital camera system 300 allows for the synchronous operation of multiple image elements acquiring specific area of interest all at the same interval of time. The field of view of the primary imaging element will encompass the complete intersection, the traffic signal head of the monitored approach and the offending vehicle relative position. The secondary imaging elements can be used to image the license plate area of the offending vehicle.

Figure 3B:
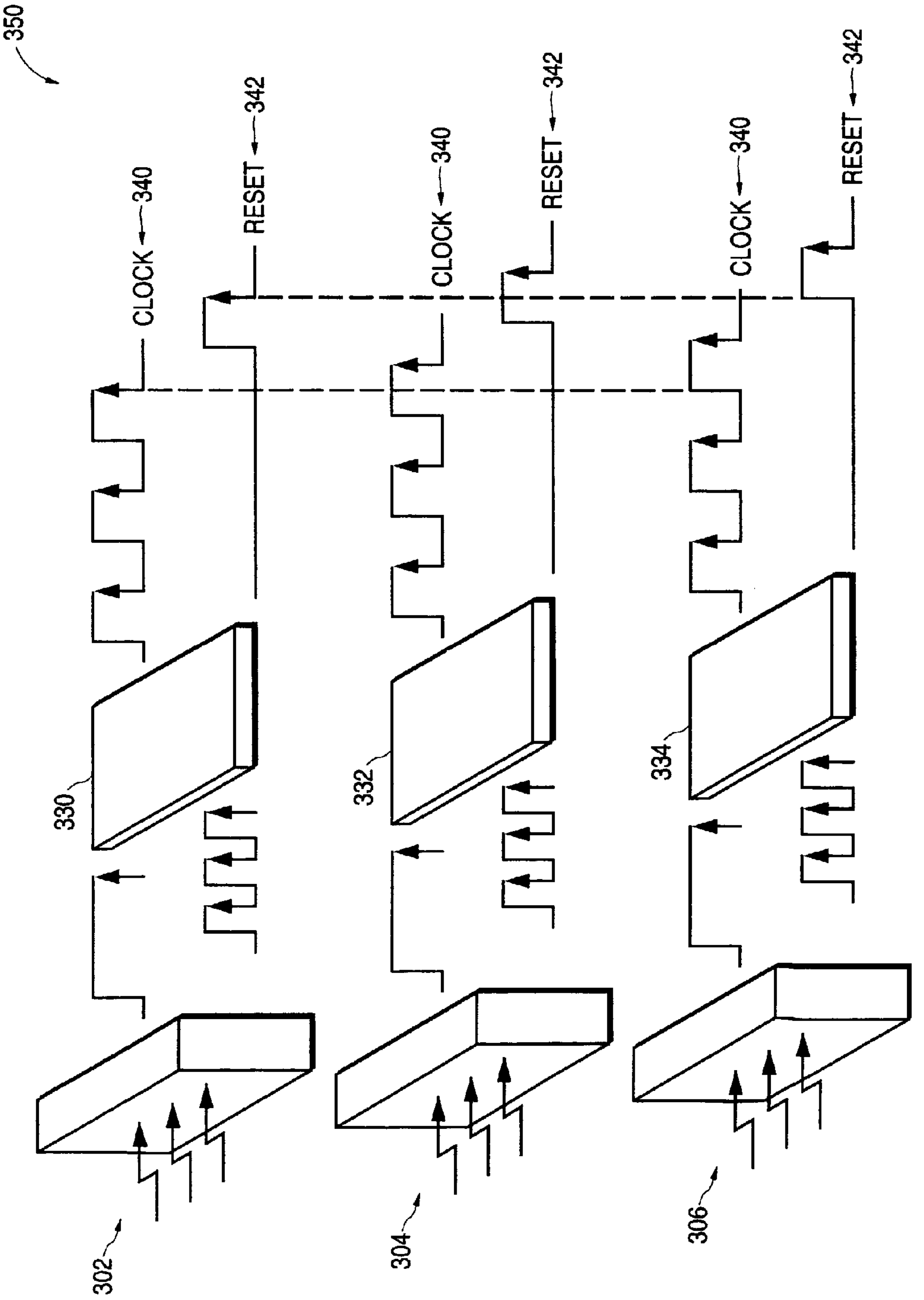
FIG. 3B illustrates the multiple element camera system of FIG. 3A in conjunction with a synchronous timing source, according to one embodiment of the present invention.

To ensure synchronism between each of the imaging elements the timing generators for each CCD is reset simultaneously and clocked by a single source. FIG. 3B illustrates the camera system 200 of FIG. 3A in conjunction with a synchronous timing source. Each of the three CCDs 302, 304, and 306 have their output signals synchronized to respective timing generator circuits 330, 332, and 334. The timing generator circuits are driven by common clock 340 and reset signals 342. The result is that each CCD will acquire and discharge the image simultaneously with the other CCD cameras. One benefit of the synchronous operation of the CCDs is that a single flash can be triggered with the resultant exposure recorded by all the CCDs.

In many circumstances, the vehicle detection system used in the tracking and identification of offending vehicles can provide actual vehicle position information such as the travel lane, speed, and direction which can be used to tighten the field of view of the secondary imaging elements, thus allowing a sharper and larger license plate area image. For example in a two-lane intersection or road environment, one of the secondary elements can be used to image one lane and another used to image the other lane. The advantage of this system is that two secondary cameras can share the same data path as either one lane or the other will only be imaged.

In many circumstances more than one camera system (incorporating the host computer, imaging elements and enforcement logic) may require supplemental camera systems to provide additional or more optimal fields of view of the offense. One such requirement is the acquisition of the offending vehicle driver's image where the primary detection camera is imaging the offending vehicle from behind as it approaches the intersection. In such cases it is impossible to achieve the required field of view resulting in the addition of a supplemental camera system.

In one embodiment of the present invention, distributed computer and network technologies, such as DCOM (Distributed Component Object Module) and the equivalent CORBA (Common Object Request Broker Architecture), are implemented by the traffic enforcement system 100 to provide a mechanism of seamless imaging element attachments. This allows for the effective increase in the number of imaging elements, while still preserving the single enforcement camera system ideology.

Video Camera System

For the system illustrated in FIG. 1A, the intersection camera system 102 includes a video camera system 122. As shown in FIG. 1C, this camera can be a single digital video camera mounted along with the still cameras at a particular location that provides a sufficient line of sight to the monitored intersection or location. In an alternative embodiment, the video camera may be an array of two or more video cameras each providing a distinct field of view of the monitored location. The resulting videos can then each be provided separately to the data processing system 104, or can be combined to form a composite video image.

Figure 14:
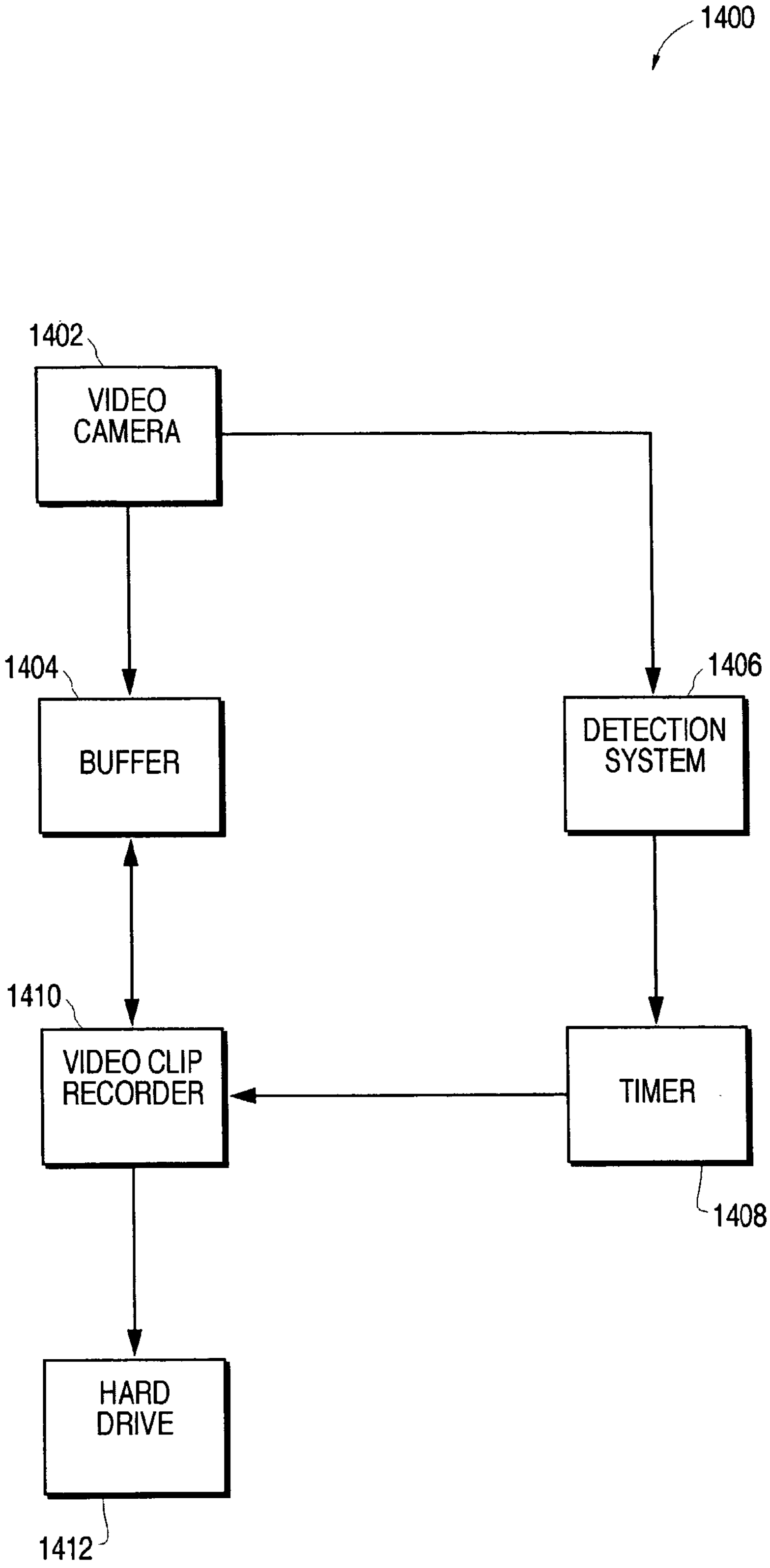
FIG. 14 is a block diagram that illustrates the main components of the video camera system illustrated in FIG. 1A.

FIG. 14 is a block diagram that illustrates the main components of video camera system 122. In system 1400, video camera 1402 is a digital video camera that produces video data in PAL, NTSC or other format, which can then be processed to produce streaming video in compressed form such as MPEG, MPEG2, Quicktime, AVI, or similar formats. In one embodiment, the video camera shoots non-stop video footage of the location. The digital video data is stored in a buffer 1404, which can be any type of memory (e.g., RAM, RAM-disk, tape, and so on) that is sufficient to hold at least a portion of the video footage shot by the camera. A detection system 1406 is coupled to the video camera 1402. Upon detection of an offense, a timer 1408 is started. The timer is programmed to stop after a predetermined period of time. At the end of the timer period a clip or "snapshot" of the buffer contents is taken by video clip recorder 1410. The video clip recorder takes the video clip recorded by the video camera for the time period of the timer plus a period of time prior to detection of the offense. The buffer and video clip recorder are used to provide a clip of the offense plus moments immediately before and after the offense. Thus, in order to catch, for example, six seconds prior and six seconds after an offense is detected, the buffer 1404 holds at least twelve seconds of footage in memory. When an offense is detected, the system starts a six second timer, at the end of which it takes a video clip of the current buffer contents and stores it to a persistent memory, such as hard drive 1412. This storage (hard drive) can also be used to store the still images of the offense. Thus, the resulting video record can be incorporated with the conventional evidence set provided by the still cameras.

Figure 15:
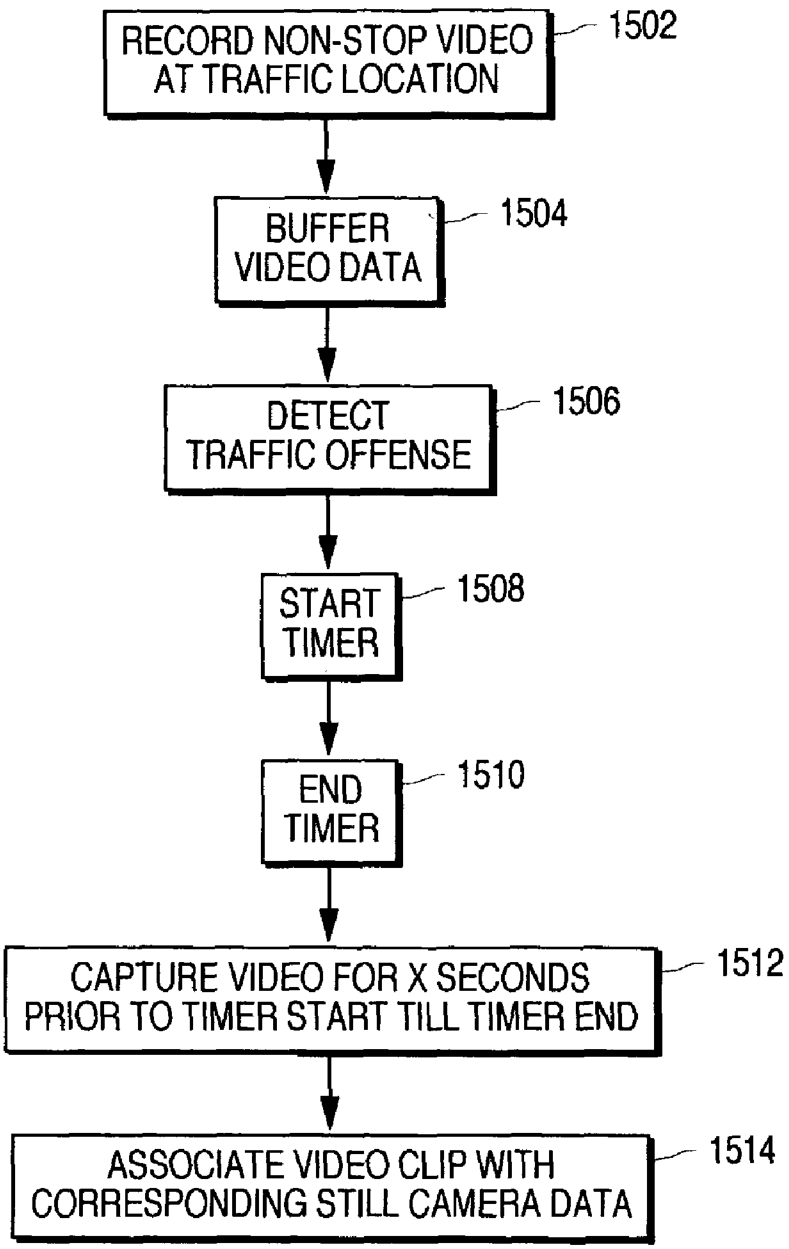
FIG. 15 is a flowchart illustrating the steps of capturing a video clip of a detected offense, according to one embodiment of the present invention.

FIG. 15 is a flowchart illustrating the steps of capturing a video clip of a detected offense, according to one embodiment of the present invention. In step 1502, the video camera 1402 records a non-stop loop of video of the monitored location. This video data is buffered in buffer 1404, step 1504. The detection system 1406 detects a traffic offense, step 1506. The detection of an offense triggers a timer 1408 to start for a set period of time, step 1508. After the timer period, the timer stops, step 1510. In step 1512, the video clip recorder 1410 captures and clips from the buffer a video clip running from a set time prior to the offense to the end of the timer period. The video clip is then stored in a memory, such as hard drive 1412, and associated with the still camera data of the offense, step 1514.

As illustrated in FIG. 14, the video recording system incorporates a detection system 1406 for detecting the occurrence of a traffic violation. The detection system includes can consist of a physical loop or trip-wire embedded in the road surface to detect the improper presence of a vehicle. In one embodiment, the detection system employs one or more inductive loops installed in one or more lanes of the road surface of the monitored location. The loops may be a single inductive loop sensor, a pair of inductive loop sensors or a single inductive loop sensor interposed between a pair of piezo sensors installed in the road surface. Where a pair of inductive loop sensors is employed or where a single inductive loop sensor is interposed between a pair of piezo sensors, a second inductive loop sensor, the "secondary loop", may also be employed following the first.

Figure 16A:
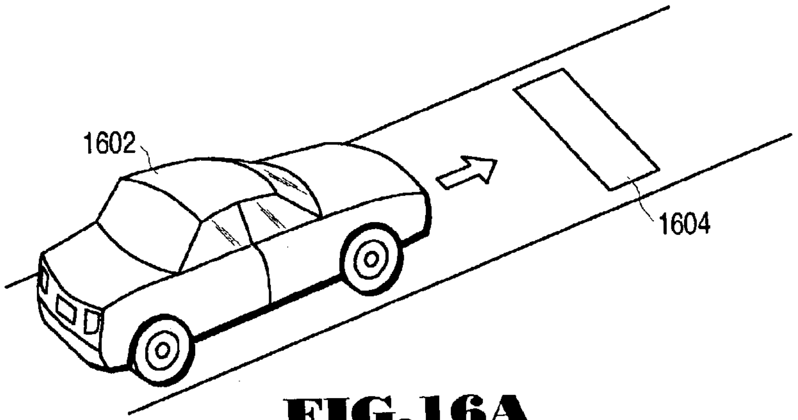
FIG. 16A illustrates a detection system using a single inductive loop installed in the road surface.
Figure 16B:
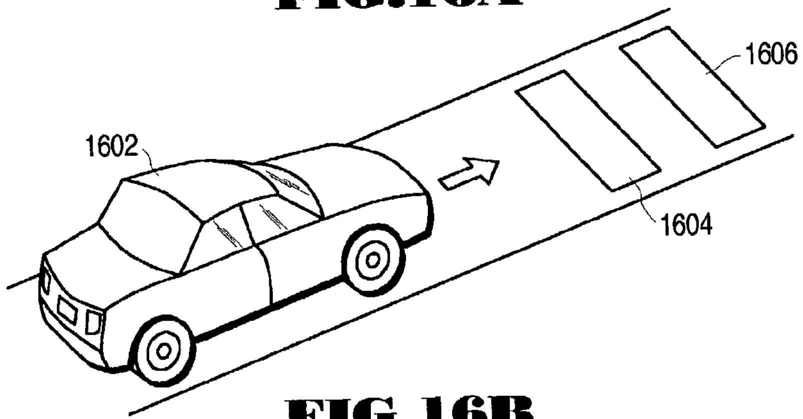
FIG. 16B illustrates a detection system using two inductive loops installed in the road surface.
Figure 16C:
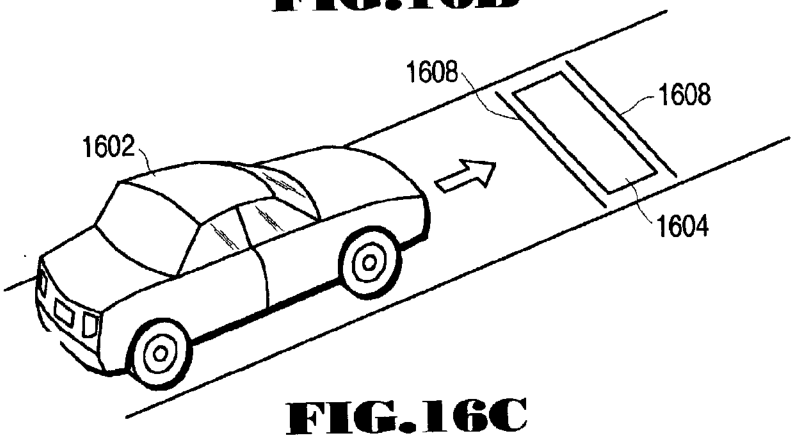
FIG. 16C illustrates a detection system using an inductive loop interposed between two piezo strips installed in the road surface.
Figure 16D:
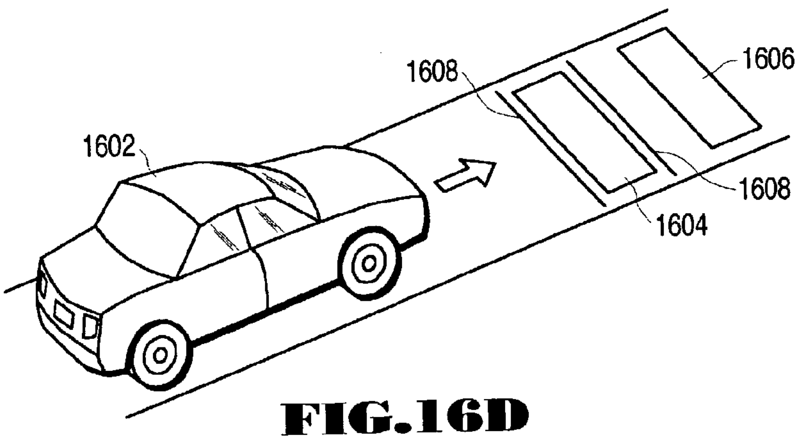
FIG. 16D illustrates a detection system using an inductive loop interposed between two piezo strips with an additional inductive loop installed in the road surface.

FIG. 16A illustrates a detection system using a single inductive loop installed in the road surface. FIG. 16B illustrates a detection system using two inductive loops installed in the road surface. FIG. 16C illustrates a detection system using an inductive loop interposed between two piezo strips installed in the road surface. FIG. 16D illustrates a detection system using an inductive loop interposed between two piezo strips with an additional inductive loop installed in the road surface.

For the single inductive loop detector system illustrated in FIG. 16A, the vehicle 1602 is detected by detecting a change in magnetic field around the inductive loop sensor 1604. The onset of the change in magnetic field (rise of the inductive loop sensor) indicates the position of the front of the vehicle over the inductive loop sensor. The return to the initial magnetic field from the change (fall of the inductive loop sensor) indicates the rear of the vehicle leaving the immediate vicinity of the inductive loop sensor. Where the magnetic field change (rise of the inductive loop sensor) is detected and does not return to normal within a set period of time it can determined that the vehicle has stopped over the inductive loop sensor.

By knowing a vehicle has stopped, the vehicle detection system has the ability to reject vehicles that come to abrupt stops at the stop line of an intersection. These "false triggers" for red light running enforcement would otherwise need to be culled manually resulting in inefficiencies in ticket processing.

FIG. 16B illustrates a system for detection using two inductive loops installed in road surface. Where a pair of inductive loop sensors is used, the vehicle 1602 is detected by detecting a change in magnetic field around both inductive loop sensors 1604 and 1606. The onset of the change in magnetic field for the first inductive loop sensor 1604 indicates the position of the front of the vehicle over the inductive loop sensor and the return to the initial magnetic field of the change indictes the rear of the vehicle leaving the immediate vicintiy of the first inductive loop sensor. The onset of the change in magnetic field for the second inductive loop sensor 1606 indicates the position of the front of the vehicle and the return to the initial magnetic field of the change indicates the rear of the vehicle leaving the immediate vicinity of the second inductive loop sensor.

By calculating the difference in time between detecting the front or the vehicle each inductive loop sensor and dividing this time by the distance between the inductive loop sensors gives the speed of the vehicle across the two inductive loop sensors, that is:

$$\text{Vehicle Speed } (m/S) = \text{Distance between loops } (m) / \text{Time between loops } (S)$$

Similarly, by calculating the difference in time between detecting the rear of the vehicle at each inductive loop sensors and dividing this time by the distance between inductive loop sensors gives the speed of the vehicle across the two inductive loop sensors.

Further, by calculating the time between the rise and fall of either inductive loop sensor and multiplying it by the speed of the vehicle gives the approximate length of the vehicle, that is:

$$\text{Approximate Vehicle Length } (m) = \text{Vehicle speed } (m/S) \times \text{Time between loop rise and fall } (S)$$

This calculation can be made more accurate by subtracting the width of the inductive loop sensor from the calculated length, that is:

$$\text{Vehicle Length } (m) = [\text{Vehicle speed } (m/S) \times \text{Time between loop rise and fall } (S)] - \text{Loop width } (m)$$

Where the magnetic field change is detected for one or both inductive loop sensors and does not return to normal within a set period of time it can determined that the vehicle has stopped over the inductive loop sensor.

FIG. 16C illustrates detection using an inductive loop 1604 interposed between two piezo strips 1608. Where a single inductive loop sensor is interposed between two piezo strips the vehicle 1602 is detected as per the single loop detector system illustrated in FIG. 16A, i.e., the onset of the change in magnetic field (rise of the inductive loop sensor) indicates the position of the front of the vehicle and the return to the initial magnetic field from the change (fall of the inductive loop sensor) indicates the rear of the vehicle. As the vehicle passes over each piezo sensor its presence is detected by way of an electric signal or pulse generated as the vehicle's weight through the tires presses down on the piezo sensor strips 1608. An accurate determination of the vehicle speed is given by calculating the difference in time between detecting either front axle passing over the piezo sensors and dividing this time by the distance between piezo sensors to give the vehicle speed, that is:

Vehicle Speed ($m/S$)=Distance between piezo sensors ($m$)/Time between piezo sensors ($S$)

As for the two-inductive loop sensor sytem, by calculating the time between the rise and fall of either inductive loop sensor and multiplying it by the speed of the vehicle gives the approximate length of the vehicle, that is:

Approximate Vehicle Length ($m$)=Vehicle speed ($m/S$)×Time between loop rise and fall ($S$)

This calculation can be made more accurate by subtracting the width of the inductive loop sensor from the calculated length, that is:

Vehicle Length ($m$)=[Vehicle speed ($m/S$)×Time between loop rise and fall ($S$)]−Loop width ($m$)

Using a single inductive loop sensor interposed between two piezo strips for vehicle detection also provides the ability to count the number of axles each vehicle has. An electric signal or pulse is generated by the weight of each of the vehicle's axles as they pass over the piezo sensor. The number of pulses detected between the rise of the inductive loop sensor and the fall of the inductive loop sensor is equal to the number of axles the vehicle has, that is:

$$\text{Number of Vehicle Axles} = \sum_{t=loop\ rise}^{t=loop\ fall} (\text{Pulses From Piezo sensor})$$

By calculating the number of axles the vehicle has, and by calculating the length of the vehicle, the vehicle can then be classified by vehicle type according to standard, readily available, vehicle classification charts or tables, as car, truck, bus, and so on. Thus, by knowing the vehicle type then the detection can be made to be vehicle type specific. The vehicle type can be used for determining whether an authorised vehicle is using a bus lane or transit way. The vehicle type can also be used for determining whether or not a vehicle is speeding according to its vehicle type, where trucks cars and busses have different speed limits.

FIG. 16D illustrates a system for detection using the piezo strip—inductive loop system of FIG. 16C with an additional inductive loop. Where the vehicle detection uses a pair of inductive inductive loop sensors, or an inductive loop sensor interposed between two piezo strips, an additional inductive loop sensor 1606 may be added after the first and second inductive loops in the case of a pair of inductive loops, or after the first inductive loop 1604 in the case of an inductive loop interposed between two piezo strips 1608, for the purposes of detecting the vehicle at a another location or position after the first detection point. The additional vehicle detection provides the ability determine the path of the vehicle after the first detection.

This system may be to used determine if a vehicle has entered an intersection against a red light after initially stopping at the stop bar. It may also be to used determine if a vehicle has entered an intersection and stopped in the intersection.

In one embodiment, the loop and/or piezo strip sensor systems illustrated in FIGS. 16A-16D are embedded in the road surface in relation to an indicator, such as a stop sign or red light. In the case of an intersection, the detectors are typically placed at or near a crosswalk controlled by the traffic light. The actual placement of the sensors depends on the layout of the intersection. As shown in FIG. 14, the detection of vehicle through the intersection or monitored location by the sensor or sensors triggers a timer 1408 that controls the extraction of a video clip from the video loop shot by the video cameras 1402.

Other physical detection systems can be used to provide detection of the offense. For example, a light-beam based trigger may be used instead of or in conjunction with the inductive loop/piezo strip to detect the presence of a vehicle.

In an alternative embodiment of the present invention, a virtual loop detector implemented in software or firmware is used for detection system 1406. In this case, the data processing system 102 of FIG. 1A includes a virtual loop detection process 139. This process defines a virtual loop or trigger line in the field of view that is continuously recorded by the video camera. When a vehicle is imaged in that virtual loop or on that line by the video camera at a time not allowed by the indicator or traffic light, the timer 1408 is triggered. Digital image processing techniques can be used to define the virtual loop and detect the presence of a vehicle in that area of the video at an improper time or improper speed.

Figure 17:
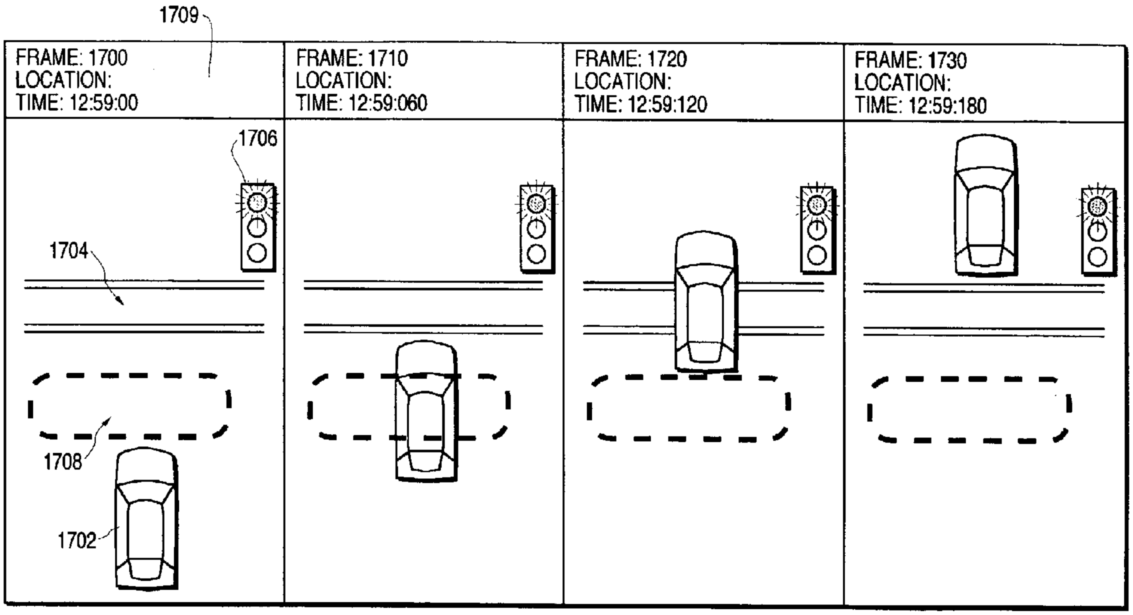
FIG. 17 illustrates a detection of a vehicle using a virtual video loop, according to one embodiment of the present invention.

FIG. 17 illustrates a detection of a vehicle using a virtual video loop, according to one embodiment of the present invention. The example of FIG. 17 illustrates four separate frames 1700, 1710, 1720, 1730, of video data. The field of view of the video camera shows the area around an intersection cross-walk 1704 and a traffic light 1706. A car 1702 is seen entering the intersection on a red light. Through digital signal processing techniques, a virtual loop 1708 is defined or drawn in an area of the intersection, such as before the crosswalk 1704. Through the use of the virtual loop 1708, it can be detemined whether the car 1702 entered the intersection at an improper time, that is, when the light 1706 was red. Total coverage of the loop 1708 by the car 1702 when the light had been red for a certain period of time, as shown in frame 1710 can cause an offense to be detected. At this point, the timer is triggered, as illustrated in steps 1506 and 1508 in FIG. 15. It should be noted that depending upon the layout of the monitored location and the capabilities of the camera and processing systems, one or more virtual loops can be defined at various locations in relation to the cross-line (e.g., crosswalk 1704).

Also shown in FIG. 17 is a frame header 1709 displayed across the top portion of each of the frames. As illustrated in FIG. 1A, data processing system 104 can include a frame editor 133 that is separate from the direct link from the camera system to the central processor. This frame editor allows the system to stamp each frame of the video with certain identifying information or relevant facts. These can include the time and place of the location, duration of the lights, speed of the car, direction of travel, and other similar items of information. Use of the video frame information can also be used to determine certain facts regarding the incident such as the speed of the vehicle and any possible acceleration or deceleration through the location, by using frame rate and timing information. For example, if the video clip is twelve seconds long and the video camera shoots 28 frames per second, the resulting clip will contain 300 frames, each 60 milliseconds seconds apart. As shown in FIG. 17, frame 1700 was shot at time 12:59:000, frame 1710 at 12:59:060, frame 1720 at 12:59:120, frame 1730 at 12:59:180, and so on. This time information can then be used to determine speed and acceleration for the vehicle by using known distances for the location.

By correlating the header information stamped on the video frames with the information associated with each of the still photos of the event, a tightly coupled evidence set of still and video data can be combined and generated. Alternatively, in embodiments in which a single video camera is used with no still cameras for the intersection camera, the stamp information allows individual frames to be used as still images, provided that the resolution of the video camera is high enough to provide legible identifying data. To ensure the integrity of the image data that is provided to the authorities, the frame editing functions in frame editor 133 can be restricted to only data stamping to prevent undue tampering or alteration of the actual raw video data.

The detection system 1406, in either the physical or virtual embodiments can be used to trigger both the video cameras 122 and still digital cameras 120 for system in which both types of cameras are used. Upon detection of an offense, the still camera or cameras shoot a series of still photos, and the timer/video clip recorder process is executed for the video camera footage.

Data Processing System

As illustrated in FIG. 1A, the images captured by the intersection camera system 102 are processed in data processing system 104. Data processing system 104 includes central processor 132, primary images file server 134, verification module 138, quality assurance check module 140, database 136, and notice printing module 142. In general, the data processing system 102 largely processes digital still images provided by the on-site still cameras 102. The video clip data provided by video cameras 122 is primarily provided to supply background context data for the moments surrounding the incident to help the viewer determine if there are any mitigating or aggravating circumstances. The video camera thus records footage both before and after the offense is detected. This provides the enforcement agency with a more complete record of the events leading up to and following on from the offense, thus helping to better perceive the context of the offense. For example, the video footage may show that a car entered the intersection to yield to an emergency or police vehicle responding to an emergency, or that the car was involved in a collision before or after entering the intersection.

The central processor 132 executes the main software program that implements the traffic violation monitoring and reporting system. The central processor 132 is designed to manage the remote camera systems and receive their incident data and image information via modem. The central processor contains its own database for recording camera system information, but also sends information to the main database 136 in the data processing system 104 for each detected incident or test shot.

Figure 6:
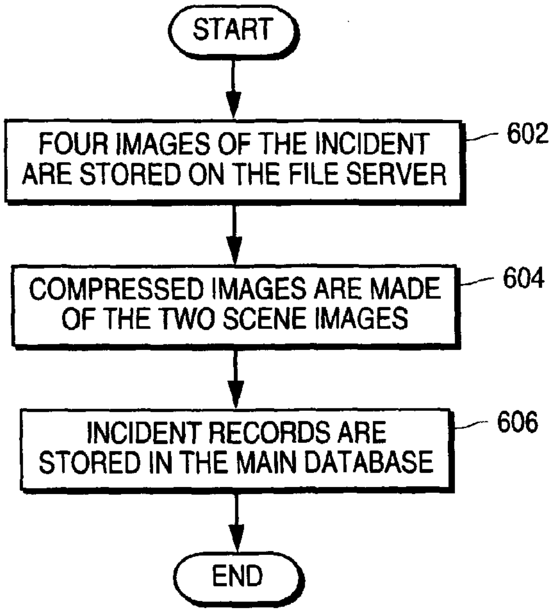
FIG. 6 is a flowchart that illustrates the steps that are executed by the central processor when incident information is received from an intersection camera system, according to one embodiment of the present invention.

FIG. 6 is a flowchart that illustrates the steps that are executed by the central processor 132 when incident information is received from the digital still cameras of intersection camera system 102, according to one embodiment of the present invention. In step 602, four images in an appropriate digital format (e.g. GIFF, TIFF or JPEG format) are stored on the primary images file server 134 in an area which is regularly archived and which is available for read-only access by verification users. These images constitute the primary evidence, which is digitally signed to prevent any subsequent undetected manipulation. The four images typically consist of two scene images, a driver's face image, and a license plate image.

In step 604, compressed images in JPEG format are made of the two scene images. An incident record is then stored in the main database 136 with associated records containing the two compressed scene images and the address path of the face and plate TIFF images, step 606. The incident record is assigned a unique incident number, which is used to link it to all other associated records throughout its lifecycle.

Figure 2:
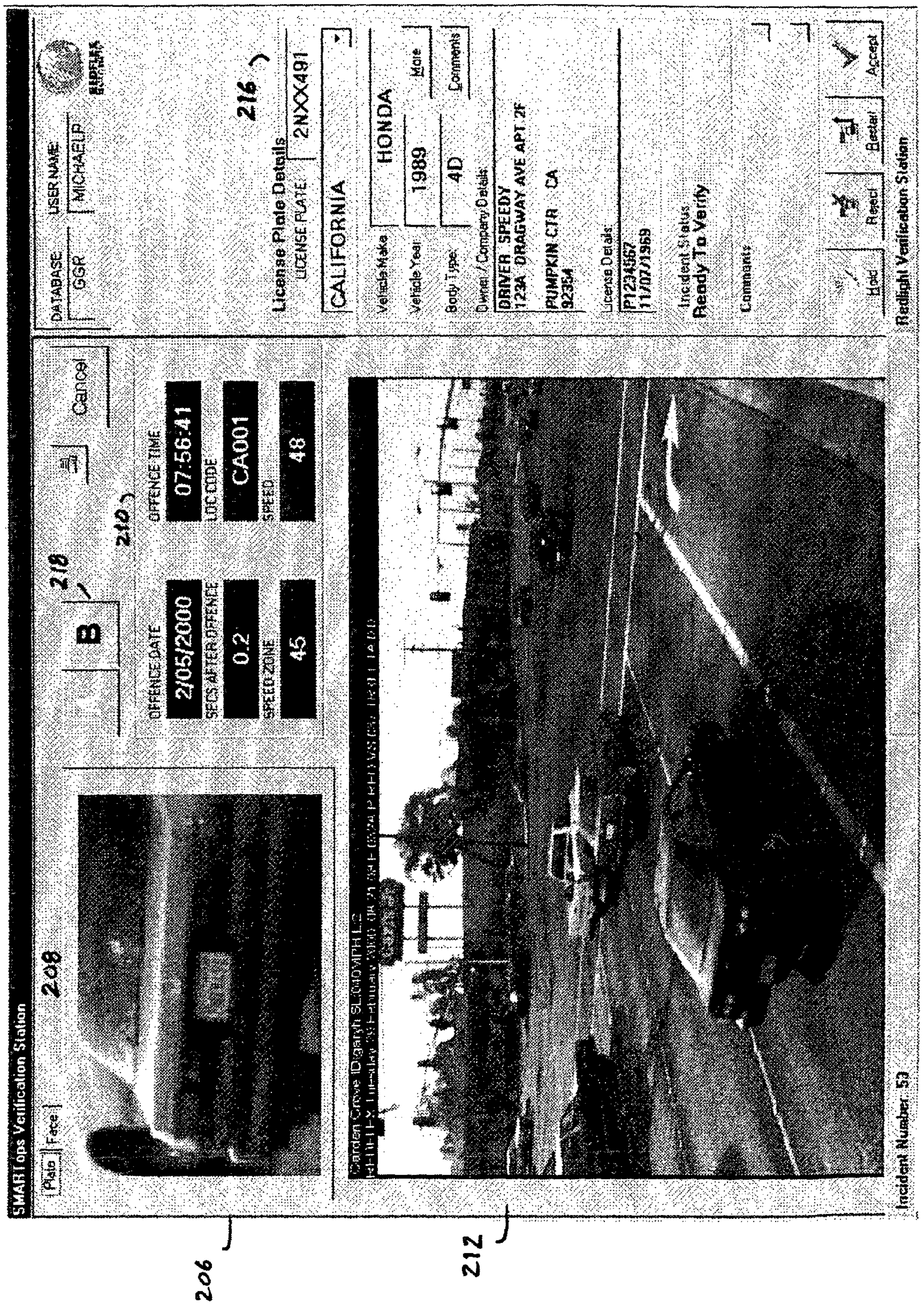
FIG. 2 illustrates a photographic image and accompanying reporting information provided by the camera system and data processing system of FIG. 1A, according to one embodiment of the present invention.

The verification module 138 within the data processing system 104 allows trained operators to check that all of the legal and business rules relating to the incident have been met in the captured images and data. That is, the operators verify that the incident is a legitimate offense and that the driver can be readily identified. In one embodiment of the present invention, when a user logs onto the verification module 138 they are presented with a display screen which consists of five main information areas. FIG. 2 illustrates the display of the verification module for an exemplary incident, according to one embodiment of the present invention.

Incidents are queued to the verification station by incident number so that the oldest incident is always processed first. Many of the verification application screens are also used in later processing applications, that may include quality assurance, a hold queue, an interstate queue, Police authorization, and an offense viewer.

When the incident is first loaded, the display area 206 will display the plate zoom shot. The user may then select a command 208 to view the face zoom shot. When first displayed, the uncompressed images in TIFF format will be loaded from the file server using the images' stored address paths.

Note that after an incident has been verified, later processing steps that use these images will load a compressed JPEG version of the image that has been stored in the database. This technique generally improves the speed of the system and keeps database file sizes to a minimum, at the cost of some small loss of image quality after the verification stage.

To allow easier recognition in later processing steps, the areas of interest of both plate and face shot images can be magnified by the verification user. For this function, a zoom control is provided. This control allows the image to be enlarged, panned, and allows intensity and contrast adjustments. The zoom control for face shots has an additional mask function to allow masking the identity of any passengers in the vehicle for privacy reasons. The zoomed images are used for all processing steps after the verification step. Note that the primary evidence images are not modified, only the compressed JPEG images that are stored in the database are manipulated.

When the incident is first loaded, the main display area 212 of the verification screen area will display the "A" scene shot. The user may click on a button 218 to view the "B" shot. These images will be displayed in JPEG format and loaded directly from the database. The A shot is taken as the vehicle crosses the stop line and the B shot is taken after the vehicle enters the intersection. As illustrated in FIG. 2, the "B" scene shot is displayed.

In FIG. 2, display area 210 is the data block details area. This area displays a representation of the incident details as captured on site and the incident number allocated to the details at the time of insertion of the incidence into the database from the central processor. Each image captured by the system has a data bar 212 at the top of each image to provide an additional level of security. The information in the data block 210 must match the information in the data bar 212. This ensures that images have not been incorrectly assigned.

The image of FIG. 2 also includes a Motor Vehicles Department (DMV) details area 216. In this area the user types in the license plate details from the incident vehicle and executes a plate look-up from the DMV database. In general, the DMV lookup consists of a number of automatic steps, including looking up the registration number of the vehicle to return registered owner(s) details, looking up personal details of the driver to retrieve a driver's license number for the registered owner returned from the first lookup, and looking up the driver's license to return complete driver's license details.

Figure 7:
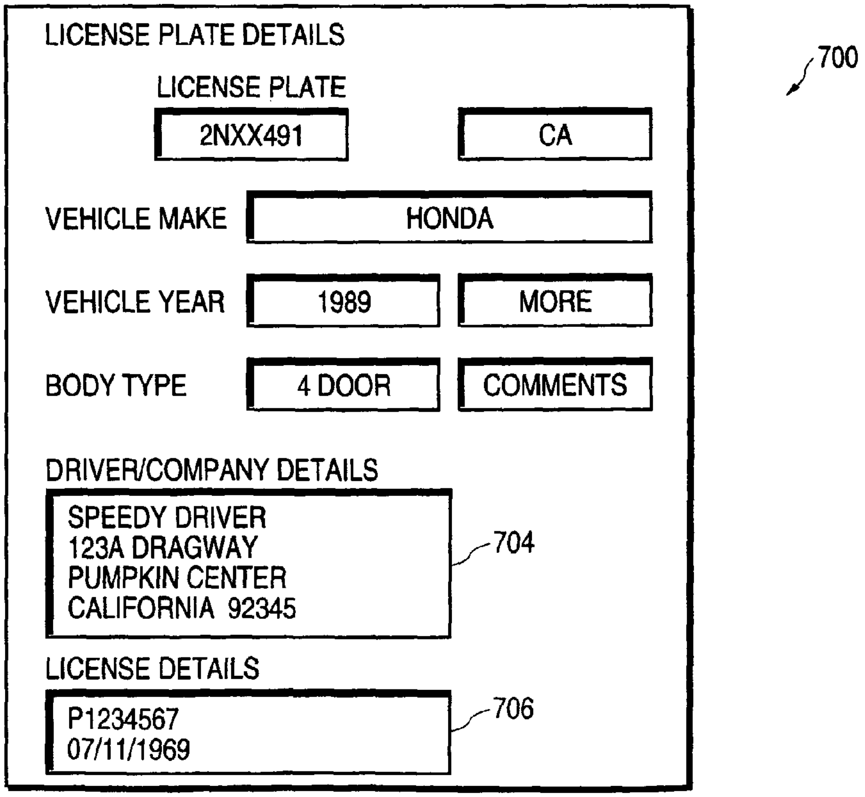
FIG. 7 illustrates the DMV details area of the verification screen, according to one embodiment of the present invention.

Following a successful lookup, the DMV details area 216 of the verification screen of FIG. 2 will display some of the retrieved information. FIG. 7 illustrates the DMV details area in greater detail. The license plate and vehicle information is displayed in the top half of display area 700. The name and address of the driver, or company, if the vehicle is company-owned is displayed in display area 704, and the driver's license information for the driver is displayed in display area 706.

Figure 8:
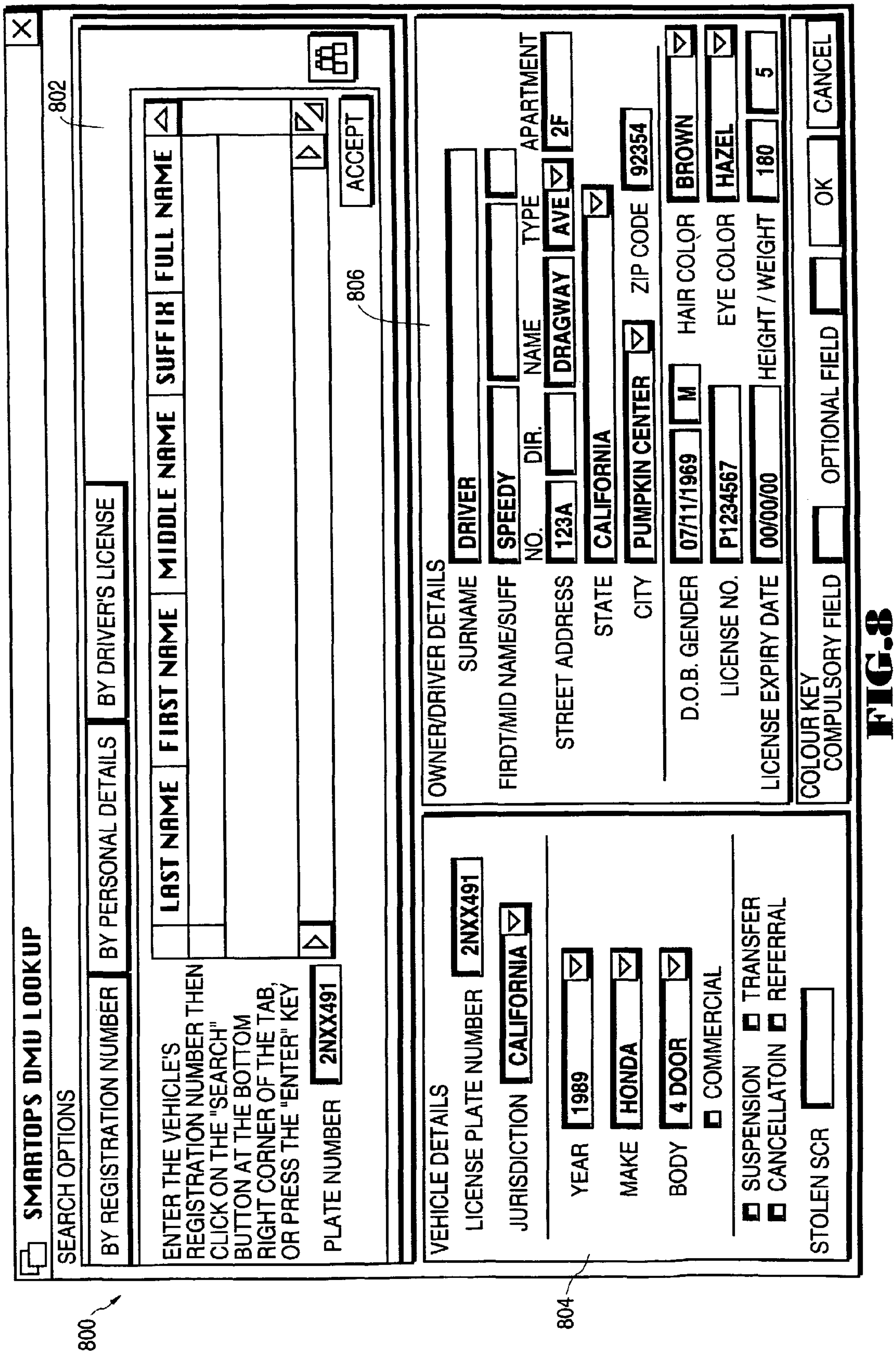
FIG. 8 illustrates a DMV lookup screen, according to one embodiment of the present invention.

If any one of the steps of the DMV lookup is unsuccessful, a DMV lookup screen may be presented to the user. FIG. 8 illustrates a DMV lookup screen, according to one embodiment of the present invention. The DMV lookup screen 800 allows the user to execute each of three lookup steps incrementally. The user is able to enter the various items of information, such as the vehicle registration (license plate) number, personal details of the driver, or the driver's license number. The registration number of the vehicle is entered and displayed in display area 802, the vehicle details are entered and displayed in display area 804, and the driver details are entered and displayed in display area 806.

Use of the DMV lookup screen may be necessary in the event of multiple records being returned for either the registration number or the personal details lookups, i.e., if more than one owner was registered against the vehicle or if more than one person had the same name. The DMV lookup screen may also be used to modify user-defined search criteria in the event of returned owner records being flawed in some manner, such as if a "0" number was included in a name instead of an "O" letter.

The returned alleged offender details will be transferred to the relevant fields on the lower half of the DMV lookup screen 800 when the user clicks the 'Accept' button on the verification screen of FIG. 2. The user may execute multiple lookups if unsatisfied with the initial returned results. Each DMV lookup will be logged against a particular user and date/time stamped. The lookup log can be made viewable.

This area at the bottom right of the verification screen of FIG. 2 shows the buttons 218 corresponding to the different ways the incident can be processed by the user, i.e. how the status of the incident should be updated.

The user may click the 'Hold' button to put the incident "on hold" if there is not enough information to accept or reject the incident. To put an incident "on hold", the user must also select the hold reason from a displayed hold reasons form. The most common reason to do this would be if the vehicle did not have an in-state registration. For this circumstance, an interstate lookup process might be implemented.

If the user decides the incident is not a valid offense, or for any other reason cannot be issued to an alleged offender, the incident can be rejected using the 'Reject' button. In this case, the user will be presented with a reject reasons form to select the reason in the same way as for hold reasons.

The user may decide to restart an incident, which would remove all zooming, masking, and also clear any DMV details that may have been returned. In the case of an incident being restarted, the history of the incident would reflect this and any DMV look-ups would also have been logged. The last option is to accept an incident as valid.

After one of the four choices has been selected, the next incident will be displayed and the process repeated. The user will have the ability to view an incident's history to date and add new comments to an incident.

In one embodiment of the present invention, the DMV lookup form 800 is also available from other applications. For example, the form may include an interstate queue application, so that when another state returns information on registration requests sent to it, the user can enter registration details against an incident. This area of the form may also be editable in the hold queue application when the incident is being 'verified' to extract name and address details from returned DMV registered owner data. It will generally not be editable in the hold queue application when the incident has already been verified, i.e., when the incident had been put on hold from the quality assurance module.

The display screen illustrated in FIG. 2 may includes a sub-window that allows viewing the video clip of the offense. Upon requesting access and playing of the video clip, the system displays the video extracted by the video clip recorder. Typically this comprises a short video clip showing the circumstances of the offense including a few seconds before, during, and after the offense. This enables the reviewer to view the circumstances surrounding the offense.

Quality Assurance Process

The data processing system 104 of FIG. 1A also includes a quality assurance (QA) module 140. In one embodiment, the QA module uses the same user interface as the verification module, illustrated in FIG. 2. In the QA module, the user does not have any image editing facilities and may not change any of the vehicle or alleged offender details or execute a DMV look-up. All incidents that have a status of "Accepted by Verifier" or "Accepted by Hold Operator as Verifier" will be available for quality assurance. The system tracks users who are logged in to the QA module and will not queue any work to them that they have "verified", be it at the verification application or hold queue application.

When a quality assurance session begins, the four images (plate, face, scene A, scene B) in compressed JPEG format are loaded from the database 136. The plate and face images displayed are those that were manipulated at the verification stage 138. Initially the scene A and zoomed plate shots are displayed. The data block details area is then populated, and the current incident status is displayed.

The user will assess the incident as presented, and may accept, reject or hold the incident. Acceptance updates the incident's status to that of "Accepted by Verifier and QA". Rejecting the incidents results in the display of the reject reasons form. The user selects a reason and confirms to update the incident's status to that of "Killed" (rejected). The user will be logged as the QA operator of the incident. No further action will be taken with this incident.

If the user elects to hold, a hold reasons form is displayed, and the incident's status is updated to that of "Accepted by Verifier, On Hold by QA". The user will be logged as the QA operator of the incident. As the incident was put on hold by QA, the system will flag this condition and prevent the incident from being editable at the hold queue application, i.e., only incidents that have been put on-hold from the verification application may be editable at the hold queue application. To be editable means to be able to manipulate the face and plate shots, execute a DMV lookup or to be able to edit an alleged offender's details on the DMV lookup screen.

In one embodiment of the present invention, the data processing system 104 includes a hold queue application. Incidents that may be valid but need further clarification are queued to this application. The application starts by displaying a hold queue main screen that shows a list of all incidents that are on hold that can be processed by the current user. The user may click on any listed item and then click an appropriate command to display the same screen as used in the verification application. Incidents may be put on hold by either the verification module 138 or the quality assurance module 140. When an issue has been resolved for an incident, the operator can then advance the incident by either accepting or rejecting it. If the incident was put on hold at the verification stage, then the holds operator becomes the effective verifier.

In one embodiment of the present invention, the data processing system also includes an interstate queue module. This module appears and operates in the same manner as the hold station that deals with other incidents put on-hold. For this application, a list of registrations can be printed to be faxed to another state registration authority, so that they can provide details by return of fax. This would normally be performed after entering a search filter to list only incidents of one jurisdiction that have not been assessed. The user would then update an incident's details by finding the relevant incident. The incident may then be advanced to QA as normal.

Police Interface Modules

The traffic violation monitoring and reporting system 100 of FIG. 1A also includes an interface to one or more police departments 106. The data processing application 104 provides the police department 106 the ability to select one of three modules. These are a police authorization module, an offense viewer module, and a police report module.

Figure 9A:
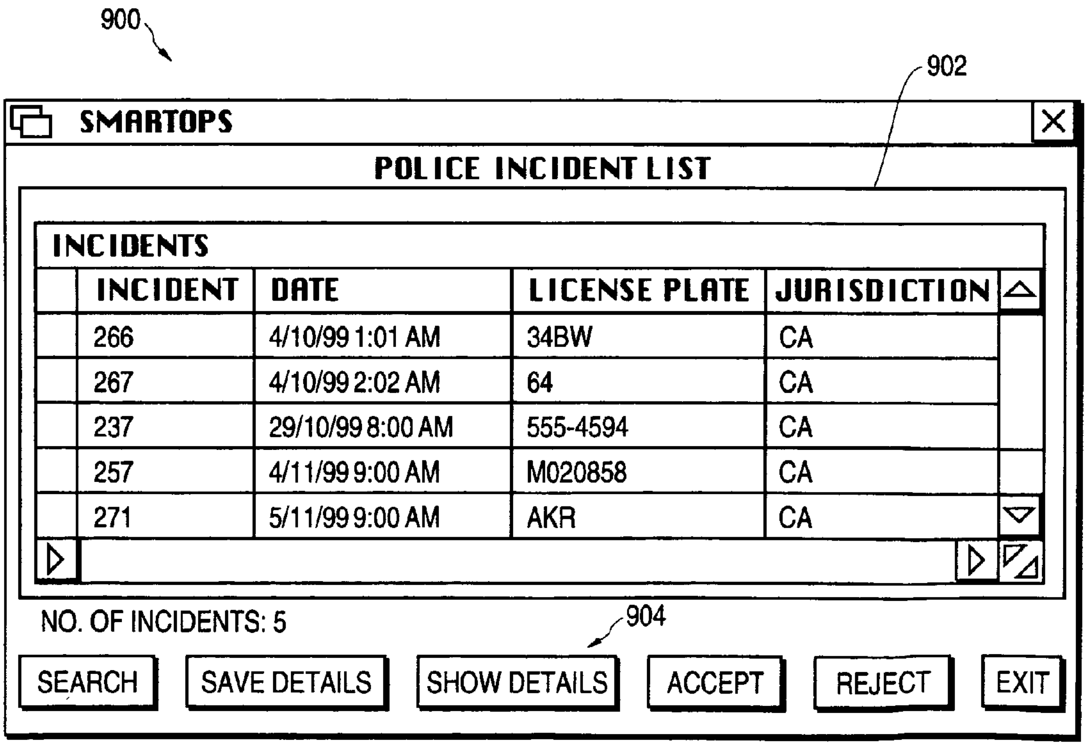
FIG. 9A illustrates an example of a police authorization module interface screen, according to one embodiment of the present invention.

An exemplary structure of the police authorization module's main screen interface screen is illustrated in FIG. 9A. Interface screen 900 provides a list 902 of incidences by date and time, with license plate numbers for the offending vehicles. All incidents having been accepted as valid by the verification and QA process will be presented on a list in (configurable) batches on the main screen of the police authorization application. Incidents will be listed for batch creation by their incident date and time, thereby the oldest will be presented the police first.

Appropriate police personnel will have the ability to view individual incident details by selecting them and clicking an appropriate command button, such as the 'show details' button 904. They will be presented with a non-editable screen, similar to the verification screen of FIG. 2. They may accept or reject a single incident from this screen. For data integrity, the police will not have the ability to put an incident on hold, or to view or enter comments.

The user (police personnel) will assess the incident and may decide to accept, reject or take no action by canceling from the incident. If the user decides to accept the incident, the incident status is updated to "Ready for Notice Processing" in the database 136 and the user is returned to the main list 902. If the user decides to reject the incident, the incident status is updated to "Killed" and the user is returned to the main list 902. The incident is logged in the database as having been rejected by police and the reason is recorded for reporting and auditing purposes. No further action will be taken with this incident. If the user decides to cancel, the incident status remains unchanged and the user is returned to the main list.

It may be possible for the authorizing officer to view each incident on the list and act on each one individually or they will at any stage return to the main list and decide to accept all the remaining incidents listed by selecting an 'Accept All' function.

Within the police authorization application, the offense viewer module displays incident images for incidents that have been confirmed as violations. This module will also be security protected and only police authorized personnel may access it. The user will use either a notice number, vehicle registration, or incident number as a search filter.

On entering a search parameter and executing a search, the system will display the four incident images, data block details, and DMV details. Additional searches can be performed from the main display in the same manner as the initial search.

The police reports module within the police authorization application allows reports to be run for police functions. The police can then use these reports to follow up on delinquent notices, and similar functions. The reports available are presented in a list and can be previewed through a police authorization application user interface.

The police authorization application can also include a delinquent notices report that lists delinquent reports in a list. An interface dialog can prompt the user for the number of days and then the report will be displayed. The report will include all notices for which payment is overdue by the selected number of days.

A dismissals report item can also be included in the police authorization application. This report lists all notices that have been cancelled because they were not processed within the time limits or because of a nomination. A nomination occurs when an alleged offender nominates another person as the driver at the time of the incident. In either case, a previously issued notice needs to be cancelled from the court records. This report can be used as a list to send to the court to request dismissal of cancelled notices.

The police authorization application also includes a notices module that allows the police department to issue and preview the Notices to Appear which are to be issued to the violators.

Figure 9B:
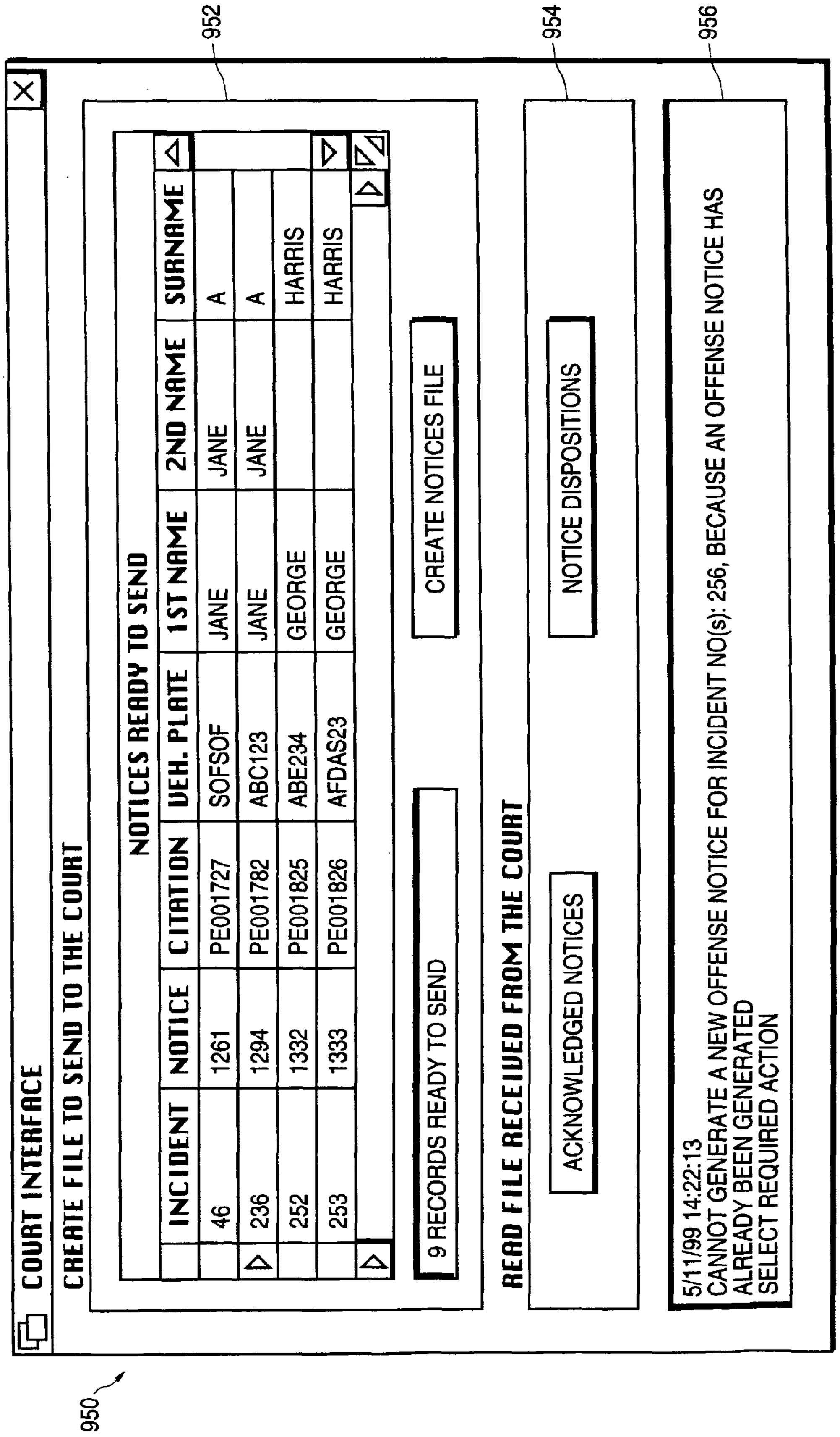
FIG. 9B illustrates an example of a court interface screen generated by the court interface module, according to one embodiment of the present invention.
Figure 9C:
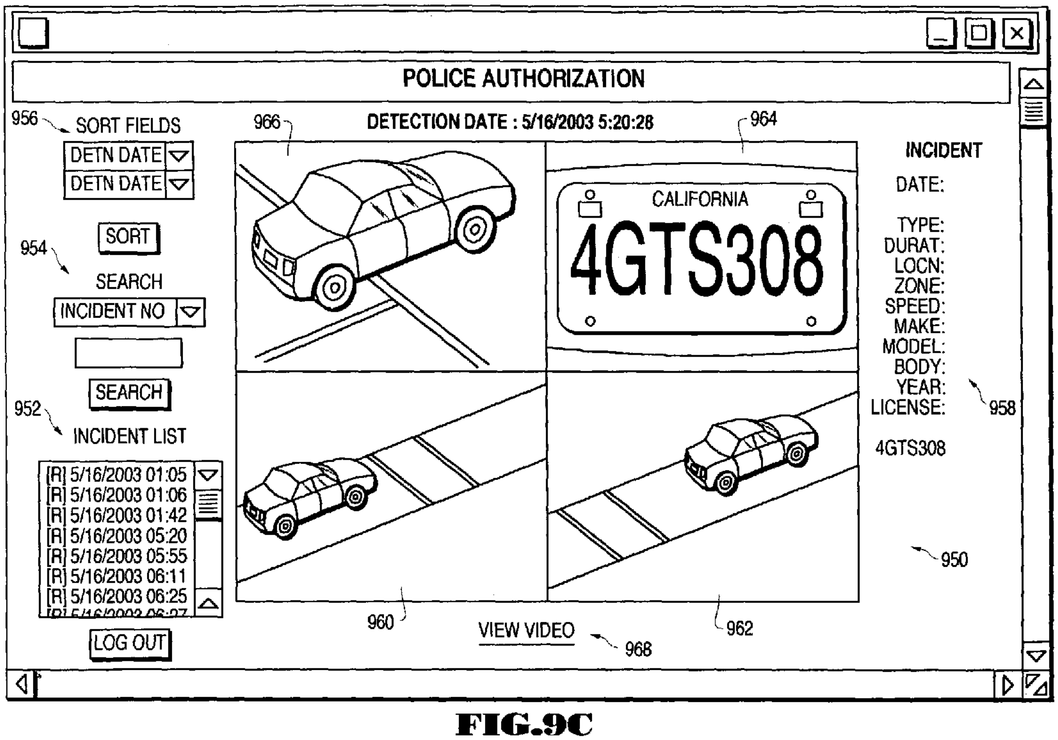
FIG. 9C illustrates a police authorization review interface that can be used by police personnel to review the photos and video clip of an incident.

FIG. 9C illustrates a police authorization review interface that can be used by police personnel to review the photos and video clip of an incident. As illustrated in screen display 950, a particular incident can be selected from an incident list 952. Incidents can be sorted and searched for using the appropriate input functions 954 and 956. Information regarding the incident is also provided in area 958 of the display screen. The main display area includes four separate windows. Window 960 and 962 show two still photos of the location from different vantage points or at different times, and window 964 displays the license plate or other identification (e.g., driver's face) of the vehicle. Each still image can be a photo provided by each of a number of still cameras at the scene, or they can be images from any one of the cameras taken at different times. Window 966 displays the video clip of the incident recorded by the video camera. The video clip is typically accessed by selecting a view video command 968. The display screen of FIG. 9C is primarily intended to illustrate one possible composition of the police authorization and review screen, and many different layouts are possible. For example, the video window may be provided as a pop-up window over the main screen, or it may be displayed as a full screen to allow the operator to view details in the video clip.

Court Interface

The traffic violation monitoring and reporting system 100 also includes a court interface module 110 that allows a user to communicate details of notices to the courts electronically, and subsequently receive updates on notice statuses from the courts. In one embodiment, this process is managed automatically using a third party scheduling program by executing database script files.

FIG. 9B illustrates the court interface screen generated by the court interface module 110, according to one embodiment of the present invention. Court interface screen 950 includes a display area 952 that lists the notices that have been approved and are ready to be sent to the alleged offenders. The court interface screen 952 also includes a display area 954 that allows access to files or documents received from the court. These may include acknowledged notices and disposition of notices processed by the court. A text display area 956 may be provided to display messages associated with any incidents listed in display area 952.

A manual court interface module can also be provided as a backup if the automatic system fails, or if unscheduled activities are required. The manual court interface module allows the following steps to be initiated: generate notice records from newly approved offense incidents, send details of new notices, receive acknowledgment (edit report) of sent files, and receive weekly dispositions. The database packages that are executed for each of these functions can either be initiated manually by clicking the interface selection, or automatically from a third party scheduling program by executing database script stored files. For every function, the details of the function are stored in a time-stamped record in log table with a unique session log id number. The number of records affected or any errors encountered is also stored.

Notice Creation

Figure 10:
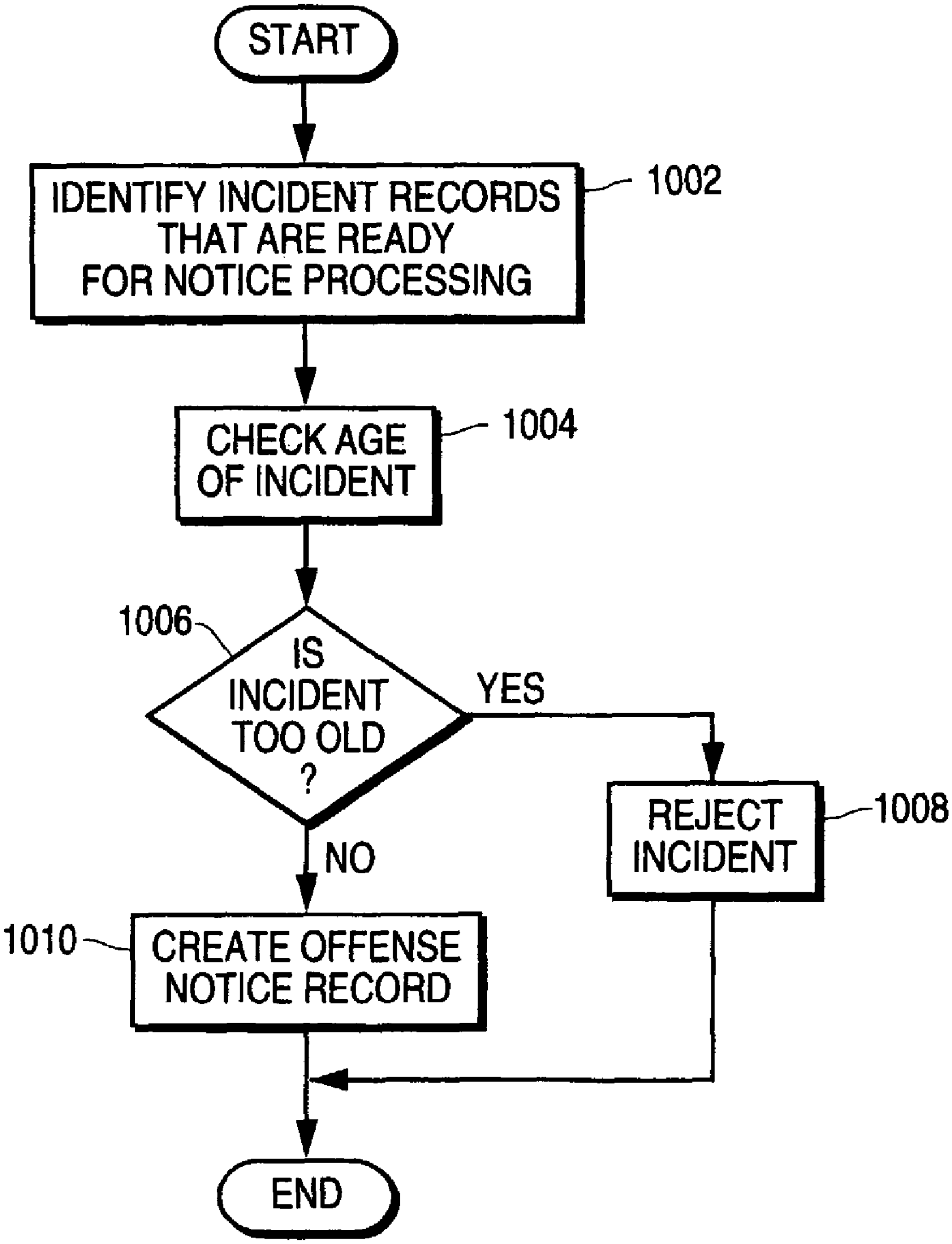
FIG. 10 is a flowchart that illustrates the steps of creating a traffic offense notice, according to one embodiment of the present invention.

In one embodiment of the present invention, the notice creation function is initiated either by a scheduler program or will occur automatically when the manual court interface screen is selected. Notice records are created by notice printing module 142 for incidents that have been authorized by the police. FIG. 10 is a flowchart that illustrates the steps of creating a notice, according to one embodiment of the present invention. In step 1002, all traffic incident records that have a status of 'Ready for Notice Processing' or 'Ready for Warning Processing' are identified.

For each incident that is found, a check is performed on the age of the incident, step 1004. If, in step 1006, it is determined that too much time has elapsed since the incident occurred, the incident be rejected on the grounds that it is too old to issue, step 1008. This typically occurs because, depending on the jurisdiction, notices must usually be sent to an alleged offender within specified period of time (e.g., 15 days) of the offense date, address details update date, or nomination date.

For each incident found that is within the allowed time period, an Offense Notice record is created and assigned a citation number, step 1010. The created notices will now have a status of 'New' if the status was 'Ready for Notice Processing', or 'New Warning Letter' if the status was 'Ready for Warning Processing'. An associated offender and offender address record is created to store the personal details and address of the owner that was selected during the incident verification process.

After the appropriate notices have been created, the notices may be sent to court. This function can be initiated either by a scheduler program or manually by selecting a 'Create Notices File' selection on the court interface display screen 950. For this process, the system first searches for all notices with the appropriate status (e.g., New), and excludes all those that are too old. The details of the notices are written to a new export file (with a pre-defined name and location) in a format that is suitable for the court's system. Notices that are too old have their statuses updated to 'Sent to Police for Dismissal'. The other notices will have their statuses updated to 'Sent To Court'. The system may display a count of how many notices were updated to 'Sent To Court' and 'Sent to Police for Dismissal'.

The export file created may have the text 'EDIT ONLY' in the header to indicate that the file is to be checked for syntax errors by the court system and that an edit report is to be produced by the court system to act as an acknowledgement of receipt. A procedure in the court system to process the file is to be initiated via a modem connection, which may be handled by a scheduler program or manually by an operator.

If the notice is to be issued to the violator by a third party, non-judicial or non-police agency, the court must acknowledge receipt of a notice before that party can print a hardcopy of it and mail it to alleged violator. The notice printing module of the data processing system 104 provides a user interface screen that lists and displays in preview form, notices to be printed. Such a notice preview form is illustrated in FIG. 11.

In one embodiment of the present invention, printing a notice involves several main steps. First, the current user is saved as the issue user in the notice record, and the notice status is updated to "Notice Printed" or "Warning Letter Printed", as appropriate. Two scene images, a plate zoom image, a face zoom image, a police authorizer signature image, and the issue user's signature image files are copied from the database 136 into a data processing directory as graphic files (such as .jpg files).

Next, the document is previewed on the screen to ensure all images are retrieved, and then the document is printed to the printer. Note that a preview of a document that has not yet been printed may not display the details of the person issuing the notice because it has not yet been issued.

FIG. 11 illustrates a notice preview displayed in a user interface screen, according to one embodiment of the present invention. The following details appear on each Notice to Appear: the name and address of the alleged offender, details of the incidence, the four incident images as saved by the verification operator, the location of the incident, the time and date of incident, and fine payment information. Also included is a section where an alleged offender may complete details of the person that they may wish to nominate as the driver of the vehicle at the time, as well as information relating to what the alleged offender may do if he or she disagrees with the allegation. The notice may also include a scanned signature of the police officer that authorized the incident for issuing as an offense, and a scanned signature of the person that issued the notice.

Depending upon the computer implementation, the report preview function may also allow the user to manipulate the notice file, such as print to the notice to a selected printer, or export the notice to an HTML or text file.

In one embodiment of the present invention, an alleged offender may claim they are innocent and subsequently nominate another driver. There are two methods whereby a person may do this. First, the Notice to Appear will have a section on it that the person may complete and return to the party that issued the notice, or the person may complete a Certificate of Innocence at a police station and the police will forward it to the issuing party.

The data provided by the traffic violation monitoring and reporting system constitutes legal evidence that can be used to convict a traffic offender for a traffic violation. In one embodiment of the present invention, the evidentiary package consists of a copy of the notice to appear, in addition to other documents, which are not necessarily produced by the system. Such documents could include information supplied by the court, a chain of evidence testifying as to the integrity of the image data, and a statement of technology.

Image Analysis Expert Systems

In one embodiment of the present invention, an image analysis system to automate components of the data processing system is implemented. Image analysis is a process of discovering, identifying and understanding patterns that are relevant to the performance of an image-based task. One such task is the ability to automatically locate and read license plate information in evidentiary images. Here the pattern of interest is license plate shapes and alphanumeric characters.

The goal of the image analysis is to automatically locate these objects and perform character recognition with the accuracy of a human operator.

The advantage of an image analysis system in the verification process of the data processing system would be that all vehicle, owner and incident details can be provided for visual verification at a first instance all complete and thus requiring little or no manual data entry.

The elements of image analysis can be categorized into three basic areas, low level processing, intermediate level processing, and high level processing. The categories form the basis of a framework in describing the various processes that are inherent components of an autonomous image analysis system.

Low level processing deals with the functions that may be viewed as automatic reactions that require no intelligence on the part of the image analysis system. This classification would encompass image compression and/or conversion such as the application of a standard set of filters for image processing.

Intermediate level processing deals with the task of extracting and characterizing components or regions in an image for low level processing. This classification encompasses image segmentation and description that is the isolation, extraction and categorizing of objects within an image.

High level processing involves the recognition and interpretation of the extracted objects. The application of intelligent behavior is most apparent in this level as it entails the capacity to learn from example and to generalize this knowledge so that it can be applied in new and different circumstances.

Image analysis systems utilizing Expert Systems technology, can be used to accurately identify, extract, and translate areas of interest imprinted or appearing in images recorded by the enforcement camera system of FIG. 1A. In general, the technology requires the acquisition of knowledge through a process of extracting, structuring, and organizing knowledge from one source so it can be used in software. There are three main areas central to knowledge acquisition that requires consideration in the development of the image analysis expert system. First, the domain must be evaluated to determine if the type of knowledge in the domain is suitable for the image analysis expert system. Second, the source of expertise must be identified and evaluated to ensure that the specific level of knowledge required by the image analysis expert system is provided. Third, the specific knowledge acquisition techniques and participants need to be identified.

The objective of the image analysis expert system is to accurately identify, extract and translate optical data appearing in the photographic evidence captured by any type of enforcement camera systems.

Many film based camera systems optically imprint textual information of the offense onto each photograph. For example speed enforcement camera systems imprint onto each image; information such as measured speed and direction the offending vehicle was travelling, the speed zone and location the camera was monitoring, the operator ID supervising the deployment, and the time and date of the offense. The process can also be applied in the identification and extraction of license plate vehicle details that can be used to identify the offending vehicle owner.

The image analysis expert system knowledge base can be derived from a range of sources such as textbooks, manuals and simulation models, although the core knowledge is derived from human experts. The human experts themselves may not necessarily be a technical resource, but may include the operators or users of the system that make decisions based upon known business processes rather than technical issues. This type of inferred knowledge obtained indirectly by these experts does provide a useful resource for the knowledge base.

Knowledge acquisition embodies several processes and methodologies to capture, identify, and extract knowledge. Although fundamentally, knowledge is obtained from human experts which provides the static core or base line, the image analysis expert system can derive it's own dynamic knowledge by establishing trends or common themes, in essence drawn from it's own experience. The system achieves this ability through a unique feedback and tracking mechanism provided by the data processing system 104. The system has the ability to determine if the information provided is correctly within a relatively short time (in some cases instantly—using any inherent validating features that may be incorporated in the extract data such as a checksum).

However, with traditional expert systems, information derived is based on a conclusion made from a set of inputs with no mechanism validating the result, thus if the same inputs are feed into the expert systems the same conclusions are made. With either expert system, knowledge acquisition is typically achieved by observing an expert solve real problems, through discussions, by building scenarios with the expert that can be associated with different problem types, developing rules based on interviews and solving the problems with them, and other similar ways. In addition to these methods of knowledge acquisition, the image analysis expert system can also draw knowledge from inferred knowledge obtained by the verification and adjudication processes' audit trail, allowing more than one result for the same set of inputs, accessing external or other indirect sources of inputs available in the problem domain, and other similar methods.

The image analysis expert system and image computer are the primary components of the image processing system used in the traffic camera office system employing an automatic infringement processing system. The image computer provides the system with all the offense information in electronic form required in issuing an infringement notice.

For a speed infringement, the image processing system will provide two digital images of each offense, one a low-resolution version representative from a digital version of the original image, the other a high-resolution extraction of the license plate area only. In addition, textual offense details appearing in captured image is extracted using Optical Character Recognition (OCR) processes.

Figure 5:
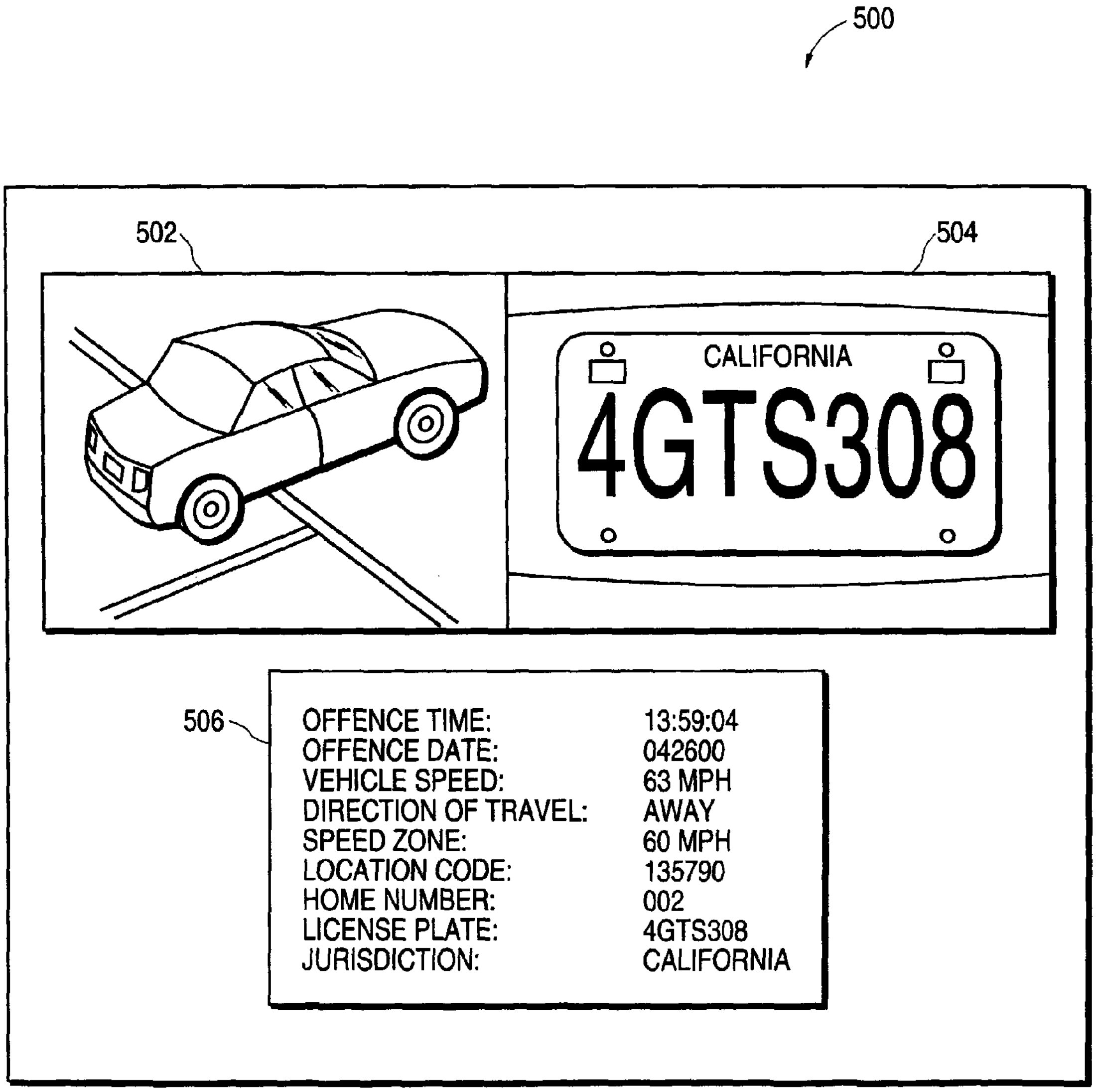
FIG. 5 illustrates an infringement set provided by an imaging processing system, according to one embodiment of the present invention.

FIG. 5 illustrates a typical speed camera offense output provided by the image processing system, according to one embodiment of the present invention. In FIG. 5, the output screen 500 includes several different image areas. An image of the offense is displayed in display area 502. A close-up image of the license plate of the offending vehicle is shown in display area 504, and the details of the offense are displayed in display area 506. This information is validated and confirmed by two separate manual processes before the actual infringement is issued. A traffic camera office infringement processing system typically consists of a high-speed film scanner providing images for the image computer to process under the control of a file arbitrator. Infringement information is automatically extracted by the image computer and stored into a database for manual verification and adjudication at the verification station.

Figure 12:
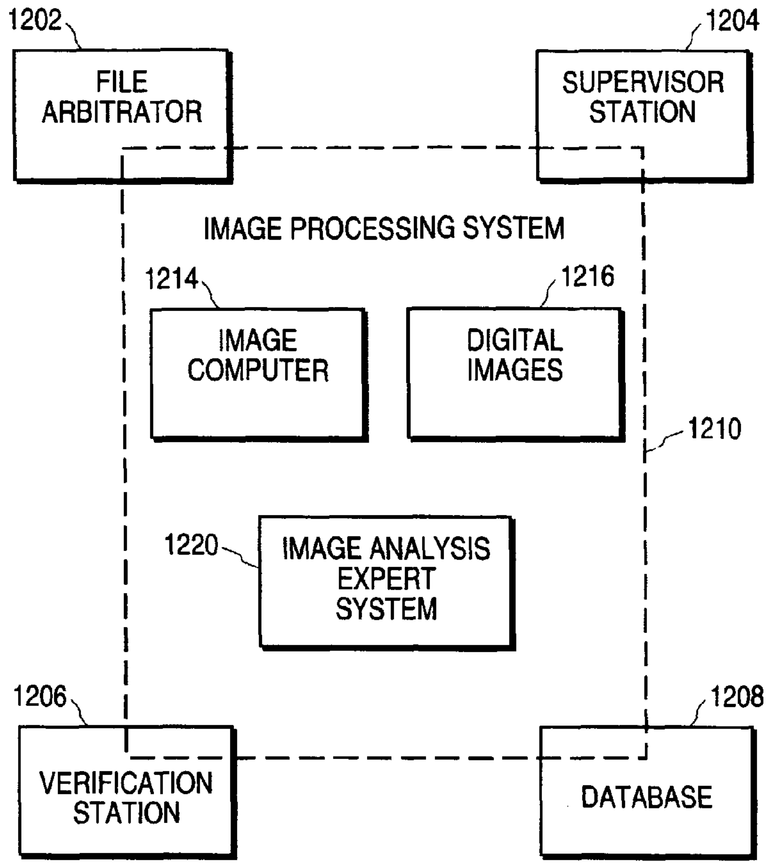
FIG. 12 illustrates the traffic camera office infringement processing system components, according to one embodiment of the present invention.

FIG. 12 illustrates the traffic camera office infringement processing system components, according to one embodiment of the present invention. Also illustrated in FIG. 12 are the components that are encompassed by the image processing system.

Raw digital images of the offenses either obtained directly from the field digital cameras or scanned 35 mm wet film converted into a digital form. The file arbitrator 1202 provides serialized access to the raw offense data. The image computer 1214 within the image processing system 1210 performs the primary image analysis tasks and is the primary interface between database 1208 and the raw digital images 1216. A verification station 1206 provides a mechanism of visual manual adjudication of actual offense and information provided by the image processing system 1210. If the information provided is correct and the offense complies with all appropriate business rules then the infringement is issued to the vehicle owner.

The supervisor station 1204 is used to validate any offense that may have been rejected during the verification and adjudication process of the traffic camera office business flow. Database 1208 may be a relational database, such as an Ingress™ Relational Database system running under a UNIX™ operating system under the HP-9000™ platform. It provides the central repository for all data including offense images and data, audit trail and archiving.

In one embodiment, the image analysis expert system 1220 provides the image processing system 1210 with human expert like behavior, thus endowing the image computer essentially with Artificial Intelligence to solve problems efficiently and effectively.

Regardless of enforcement type all infringement images are returned to the traffic camera office for processing including all the infringement details in an electronic form as well as a camera set-up and deployment log, which the operator is required to answer. The speed camera setup and deployment log contains useful information concerning the actual deployment conditions and environment, knowledge that can aid the image analysis process.

A file arbitrator 1202 detects the new image file, and initiates the image computer 1214 to start the image analysis process. The image computer then validates the image file, extracts from the file the area of the image bounding the data block (containing the offense details), segments and represents the characters within the data block, rebuilds missing or broken characters, and translates the character objects in the text by the process of OCR. Next, the license plate of the offending vehicle is searched. Once it is found, the area is extracted for OCR, the license plate details are determined, including jurisdiction. A low resolution JPEG compressed image representing the entire image is then produced, and a high resolution JPEG compressed image crop of the license plate area only is made. The image set and OCR text data is transferred to the database.

Once the data reaches the database, it is presented to the verification station for visual confirmation and adjudication by a trained operator. The normal process of the operator is to simply confirm the offense details automatically extracted by the image computer. Once these details have been confirmed, the vehicle owner details are searched and presented for content and syntax validation. Once the vehicle owner details are confirmed, the offense data is passed onto the quality system for inspection and issuing of an actual infringement notice.

Analyzing the process or work flow of the traffic camera office infringement processing system reveals several opportunities for the image analysis expert system to acquire and infer knowledge. From the beginning of the enforcement processing cycle, even before the film reaches the traffic camera office, the knowledge acquisition is occurring.

For instance, the speed camera setup and deployment log provide the image analysis expert system useful dynamic or temporary knowledge about the deployment configuration and environment that can be useful in the license plate extraction and OCR process. Information describing the weather condition, traffic direction and condition, the number of lanes monitored, and the lane the first few offending vehicles were traveling in, all provide useful information for the image processing system. Even though the acquired knowledge is stored temporarily (until the complete deployment has been successfully processed) archival information can also be created/updated about the camera and deployment location to help establish constants or trends (that is a site/camera profile).

Once the film data is stored into the main database, the image analysis expert system can access this data when each image computer starts processing a new image file. Since the first task of the image computer is to interpolate the data block area, the image analysis expert system can supply the imaging computer with the best data block location in the image. Accompanying this knowledge would also be the best extraction and OCR process to use (including the best performing parameters).

In the event that the processing scenario provided was unsuccessful, the image analysis expert system can provide information on alternative extraction and OCR processes. Both failures and successes are recorded by the image analysis expert system, improving the knowledge base, and hence the image processing performance and efficiency. Here the success and failure knowledge is known in real time with the aid of the check digit feature of the data block.

Next the image computer begins the license plate search and extraction process. Again the image analysis expert system can instruct the image computer to perform this process with the best performing algorithms and parameter scenario so far. Here the feedback of success or failure of the process is delayed as no automatic successful/failure mechanism exists (as with the data block check digit feature). Although the license plate location can be confirmed with the aid of the deployment log (for speed offenses) for at least the first few recorded offenses. Here the camera operator is required to record against each frame number which lane the offending vehicle was travelling.

However, until the offense is viewed at the verification station the actual image analysis performed by the image computer cannot be validated and hence the image analysis expert system cannot acquire the knowledge unless a verification priority is placed on the first few images of each new film or deployment.

The actual verification process can also influence the knowledge acquiring process of the image analysis expert system by prompting the verification operator with simple questions each time a correction is made to any part of the provided offense data. Alternative knowledge can be inferred by analyzing the corrections and business rule rejection to determine why the selected process for that particular infringement was unsuccessful.

Figure 13:
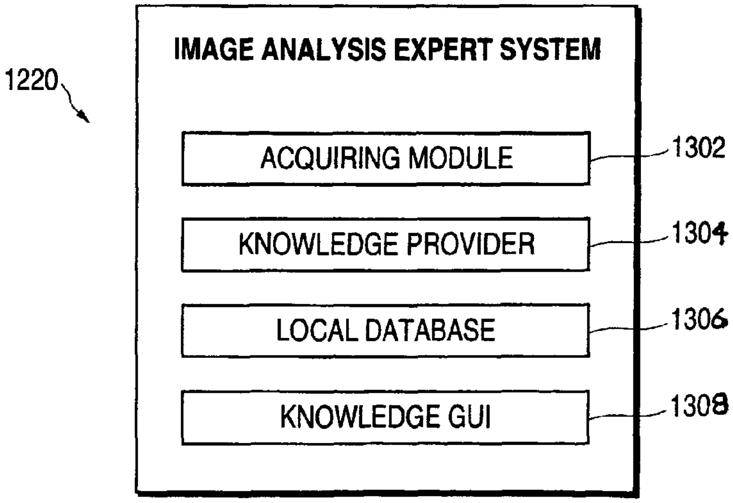
FIG. 13 illustrates the components of an image analysis expert system, according to one embodiment of the present invention.

FIG. 13 illustrates the functional components of the image analysis expert system 1220, according to one embodiment of the present invention. The acquiring module 1302 provides the knowledge database with real time knowledge deduced/provided by the image computer, inferred knowledge received directly from the verification station or analyzed from the system audit trail/system, or direct knowledge acquired from the traffic camera office infringement processing database.

The knowledge provider 1304 is the primary interface to the image computers, and provides the image computers with the necessary information and parameters to perform the required image processing tasks.

The local database 1306 serves as the central repository for all knowledge, performance statistics, short and long term data and configuration parameters for the image computers. The local database also serves as storage for neural network training set and template characters.

The knowledge graphical user interface (GUI) provides the user with the ability to display, modify, and delete the knowledge and database data. The knowledge GUI also allows the updating configuration parameters, character templates used by the OCR process and neural net training.

The image analysis expert system provides the image computer with a predefined scenario or collection of rules to follow to achieve a successful image analysis outcome. Unlike other Expert Systems, the combination of processing scenarios is relatively few since there is only a limited number of ways a data block of an offense image can be extracted. However, the image analysis expert system of the present invention is generally able to make adjustments to the parameters used by each process or rule, and therefore has an adaptive ability. This is achieved by deliberately varying these parameters and tracking or tracing the results through the system.

This mechanism of fine tuning the scenarios (or in some cases applying different scenarios all together) is called "sampling". Sampling is a mechanism employed by the image analysis expert system to effectively perform tests by deliberately applying different image processing scenarios or parameter adjustments to improve the performance.

In one embodiment, this type of operation is performed at the beginning of a new deployment or film and randomly through each batch. The changes are tracked through the traffic camera office infringement processing system. Information on the success or failure is analyzed, allowing for real time fine-tuning of the system. Although the knowledge obtained may only be used on a temporary basis (that is only for the current batch), trends can be recorded and if need be the static knowledge can be upgraded.

In reference to the image processing system, a 'scenario' is a collection of image processing rules by which the image computer follows to produce a successful image analysis outcome. The mechanism by which these rules are stored and the knowledge endowed to the image computer depends on the level of sophistication employed by the image processing system.

Performance monitoring is a method of fine-tuning or detecting poor image analysis outcomes. The mechanism used is simply the correlation and analysis of statistics derived from real-time data allowing for the fine-tuning that may be required due to small differences or abnormal deployment conditions which were not catered for as part of the fundamental knowledge. Scenario statistics are a second type of statistical data that can be correlated based upon direct scenario outcomes and scenario variants with different parameter values.

A primary component of the knowledge acquiring module of the image analysis expert system is an expert system that infers knowledge from the verification station. Knowledge such as commonly made OCR mistakes (that is, characters which a regularly incorrectly recognized), invalid license plate selection, incorrect dynamic extraction thresh hold, and other such information is used in deducing as a result of sampling.

An important requirement of this module, particularly when tracing sampling mode images, is the correct identification of the image itself. A common theme or key must be employed by the verification module, audit system, database, image computer and image analysis expert sub-systems.

Access to main traffic camera office infringement processing database can provide indirect knowledge to the image analysis expert system that cannot be obtained directly from the images or verification process. For example, deployment log information and other additional film and location information provide useable knowledge for the image analysis expert system and image computers.

The core of the image analysis expert system contains all the image processing knowledge and image computer configurational/operational parameters. The local database encompasses both static and dynamic data. The structure of the database may vary depending on the form of the knowledge and data. Character templates and Neural Network training sets may also be stored on this database.

Although embodiments of the present invention have been described as deployed in traffic environments involving red light or stop sign offenses at intersections, it is to be noted that alternative embodiments can be deployed in other traffic environments. For example, the traffic violation monitoring and reporting system can be deployed and used along a stretch of road to determine if vehicles are speeding.

Moreover, embodiments may include facilities for issuing multiple offenses for a single incident. For example, a red light camera with speed tracking can detect and record a speeding vehicle running a red light. The multiple notice may be in the form of separate notices, one for the red light offense and one for the speeding offense, or one notice recording all offenses.

Image Security

Embodiments of the present invention incorporate various methods to ensure the security and integrity of the digital images obtained at the target intersection. In one embodiment of the present invention, public key cryptography methods are utilized in the functionality of the digital camera imaging system. The original violation evidence is encrypted at the point of capture in the digital camera system 102 of FIG. 1A. As each pixel within the CCD is discharged outside the module, they are converted into a digital stream and encrypted in real time preserving its original raw form. Applying this process at this early stage eliminates the need for special purpose peripheral devices for the storage, transfer, and handling of data.

In one embodiment of the present invention, variations of known public-key and secret-key encryption systems are used to implement digital envelope cryptography for the digital traffic camera system. Each camera system is assigned a unique digital certificate that is recreated whenever there is any alteration to the system. The certificate nominates relevant system details including the camera's serial number and supplies an identifiable public key for the particular camera system. Later, this public key is used to identify the specific source for each set of evidence reaching the data processing system.

As each offense occurs, the camera system collects relevant evidence which is comprised of a number of elements or 'properties', including the various image files, the speed data, the time of offense and so on. The camera system then uses all the details of its current, unique digital certificate to build a hash function by applying recognized public key cryptography 'hashing' algorithms. The hash function is a one-way equation that is used to 'sign' each property of the offense as it occurs with its own, unique digital signature.

The camera system then places each of the signed properties for an offense into an offense database and places this in the system's server outbox (using, for example, the Microsoft™ Message Queue server outbox). The outbox server then breaks all the information in the offense database into smaller, more easily transportable packets, or 'mini-envelopes', of information. It then applies another unique digital signature to each packet (using the public key techniques above).

Where there are remote communications such as telephone, ISDN, fiber optic, and so on, between the camera site and the data processing system, the signed packets can be electronically transferred over the Internet for processing using a Virtual Private Network. In one embodiment, the data processing system server secures the transmission process by using IP SEC, a standard Internet protocol that is widely used to protect electronic transmissions over unprotected public networks.

Where there is no remote communication to the camera site, the signed packets may be either downloaded to removable media (e.g., disks), for physical transport to the data processing system, or downloaded to a camera operator's mobile computer for transfer to the system.

Each signed packet is received at the data processing system by the data processing system's outbox server, which decrypts the mini-envelope packets and automatically checks the authenticity of their signatures. The original offense database is then reassembled from its various signed properties to recreate the original offense file.

The unique digital signature on each property is then authenticated to identify the source of the property (thus defining the camera that originally captured the evidence), and verify the integrity of that property (by confirming that its original digital signature is intact and unaltered). The original properties with their intact, authenticated digital signatures are then stored as the original database (i.e., primary evidence) for the offense.

The data processing system then selects the data and image items required for citation processing, copies these, and works on the duplicates. The original files with their intact, authenticated, digital signatures are stored separately as the protected primary evidence for the offense. From then, every access or attempted access is logged to an audit chain so the life of the offense is completely accountable.

Any files with scrambled signatures alerting corruption or alteration of evidence are not sent for processing. Processing can only proceed on evidence that has been confirmed as authentic. Such an encryption and authorization system is useful for deployment in jurisdictions that allow the introduction of digital evidence.

The application of digital signatures for traffic law enforcement for the purposes of offense authentication provides for a method of securing data integrity that is independent of the media that it is stored and/or transmitted on. The process provides for mechanism of identifying the capture source (that is the camera system) and legitimacy.

As illustrated in the figures of the present application and described herein, aspects of the present invention may be implemented on one or more computers executing software instructions. According to one embodiment of the present invention, server and client computer systems transmit and receive data over a computer network or standard telephone line. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers.

In the foregoing, a system has been described for automatically monitoring and reporting instances of traffic violations that incorporates both still photo and video data. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A system for monitoring and reporting a potential traffic violation at a traffic intersection, comprising:

a violation detection system configured to detect when a vehicle is at least partially within a virtual loop that is defined by an enclosed area at the traffic intersection when a traffic signal is in a red light phase thereby committing a potential traffic violation;

a camera system comprising:

one or more digital still cameras mounted at the traffic intersection and configured to obtain at least one still image of a vehicle at the traffic intersection; and one video camera mounted at the traffic location and configured to continuously record video data of the traffic intersection from a fixed position and output the video data in an encrypted format;

a timer coupled to the violation detection system that starts timing upon receipt of a signal indicating that the vehicle is at least partially within the virtual loop from the violation detection system when the traffic signal is in the red light phase, and stops timing after a first predetermined time period;

a buffer memory that is coupled to the one digital video camera and stores a continuous video loop of the encrypted format video data recorded by the one video camera;

a video clip recorder coupled to the one video camera, the detection system, the timer and the buffer memory and wherein the video clip recorder starts extracting a first portion of a video clip of the potential traffic violation from the buffer memory in response to receiving the signal indicating that the vehicle is at least partially within the virtual loop from the violation detection system and stop extracting the video clip after receiving a signal from the timer indicating that the first predetermined time period has expired and extract a second portion of the video clip from the buffer memory during a second predetermined time period immediately prior to the detection of the vehicle at least partially within the virtual loop in response to receiving the signal indicating that the vehicle is at least partially within the virtual loop from the violation detection system;

a persistent memory configured to receive and store the first portion of the video clip and the second portion of the video clip extracted from the buffer by the video clip recorder; and a data processing system coupled to the enforcement camera system, the data processing system comprising a compiler for compiling in a data file that includes the at least one still image obtained by the one or more digital still cameras with the video clip recorded by the one digital video camera.

2. The system of claim 1 wherein the violation detection system comprises a plurality of virtual loops, wherein the plurality of virtual loops are defined in the field of view recorded by the one video camera, and the violation detection system is operable to sense the presence of the vehicle when it is at least partially present in an area defined by the a plurality of virtual loops at an improper time.

3. The system of claim 1 wherein the data processing system further comprises a frame editor process operable to separate the frames of the portion of the video data recorded by the one video camera into one or more individual frames, and to stamp each of the individual frames with data regarding the potential traffic violation.

4. A method of producing primary evidence of a traffic violation at a traffic location, comprising the steps of:

continuously recording the traffic location with a single video camera as video data;

outputting the video data from the single video camera in an encrypted format;

storing a continuous video loop of the encrypted format video data recorded by the single video camera in a buffer memory;

detecting by the single video camera when a vehicle is at least partially within a virtual loop in violation of a traffic signal that is defined by an enclosed area at a traffic intersection when a traffic signal is in a red light phase thereby committing a potential traffic violation;

recording a plurality of digital still images of the traffic violation with still cameras in response to a signal indicating that the vehicle is at least partially within the virtual loop, the still images including a vehicle image including a close-up view of a vehicle identifier associated with the vehicle;

storing the still images in a primary image database;

starting a timer upon the detection of the vehicle at least partially within the virtual loop when the traffic signal is in the red light phase;

stopping the timer upon completion of a first predetermined timer period;

extracting a video clip of the potential traffic violation from the buffer memory with a video clip recorder that includes a first portion from a start point in response to the video clip recorder receiving a signal indicating that the vehicle is at least partially within the virtual loop to an end point when the timer has stopped at the end of the first predetermined time period and a second portion of the buffer memory from a second predetermined time period immediately prior to the detection of the vehicle at least partially within the virtual loop in response the signal indicating that the vehicle is at least partially within the virtual loop up to the signal;

storing the encrypted format video clip and the at least one digital still image in a persistent memory;

decrypting the video clip by a processor; and associating the decrypted video clip with the still images by a processor for on-line review by law enforcement personnel.

5. The method of claim 4 wherein the detection step comprises the steps of:

defining in a field of view recorded by the single video camera, a plurality of virtual loops; and detecting the presence of the vehicle in an unlawful position in the fixed traffic location through the presence of the vehicle when it is at least partially present in an area defined by the plurality of virtual loops at an improper time.

6. The method of claim 4 further comprising the step of incorporating the video clip with the plurality of images for review by law enforcement personnel.

7. The method of claim 4 further comprising the steps of:

separating the video clip into one or more separate frames; and editing each frame of the one or more separate frames to include data regarding the potential traffic violation.

8. The method of claim 4 wherein the plurality of images are obtained by a digital still camera system located at a fixed traffic location, and wherein the video loop is obtained by a digital video camera system located at the fixed traffic location.

9. The method of claim 4 wherein the plurality of still images and video clip are provided to a user through a web-based display interface, and wherein the video clip is displayed in a sub-window provided in the interface.

* * * * *